(12) United States Patent
Steele, Jr. et al.

(10) Patent No.: US 10,140,281 B2
(45) Date of Patent: Nov. 27, 2018

(54) METHOD AND SYSTEM FOR DISTRIBUTED LATENT DIRICHLET ALLOCATION COMPUTATION USING ADDITION OF APPROXIMATE COUNTERS

(71) Applicant: Oracle International Corporation, Redwood Shores, CA (US)

(72) Inventors: Guy L. Steele, Jr., Lexington, MA (US); Jean-Baptiste Tristan, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 546 days.

(21) Appl. No.: 14/821,511

(22) Filed: Aug. 7, 2015

(65) Prior Publication Data

US 2017/0039265 A1    Feb. 9, 2017

(51) Int. Cl.
 *G06F 17/30* (2006.01)
 *G06F 17/27* (2006.01)

(52) U.S. Cl.
 CPC .... *G06F 17/2705* (2013.01); *G06F 17/30705* (2013.01)

(58) Field of Classification Search
 CPC .................. G06F 17/2705; G06F 17/30705
 See application file for complete search history.

(56) References Cited

U.S. PATENT DOCUMENTS

| 8,484,245 | B2 | 7/2013 | Ha-Thuc |
| 9,767,416 | B2 | 9/2017 | Tristan |

| 2012/0095952 | A1 | 4/2012 | Archambeau |
| 2013/0159236 | A1 | 6/2013 | Vladislav |
| 2014/0129510 | A1 | 5/2014 | Vladislav |

(Continued)

OTHER PUBLICATIONS

Tristan, U.S. Appl. No. 14/599,272, filed Jan. 16, 2015, Office Action, dated Sep. 25, 2017.

(Continued)

*Primary Examiner* — Etienne P Leroux
*Assistant Examiner* — Husam Turki Samara
(74) *Attorney, Agent, or Firm* — Hickman Palermo Becker Bingham LLP

(57) ABSTRACT

Herein is described a data-parallel algorithm for topic modeling on a distributed system in which memory and communication bandwidth requirements are streamlined for distributed implementation. According to embodiments, a distributed LDA Gibbs sampling algorithm shares approximate counter values amongst the nodes of a distributed system. These approximate counter values are repeatedly aggregated and then shared again to perform the distributed LDA Gibbs sampling. In order to maintain the shared counter values as approximate counter values of sixteen bits or less, approximate counter values are summed to produce aggregate approximate counter values. These small aggregate approximate counter values are shared between the nodes of the distributed system. As such, the addition of various types of approximate counters is described herein. Specifically, addition of binary Morris approximate counters, general Morris approximate counters, and Csűrös approximate counters are described in the context of distributed implementations of an LDA Gibbs sampling algorithm.

28 Claims, 3 Drawing Sheets

(56) References Cited

U.S. PATENT DOCUMENTS

| | | |
|---|---|---|
| 2014/0149433 A1 | 5/2014 | Lakshminarayan |
| 2014/0181214 A1 | 6/2014 | Price |
| 2015/0095277 A1 | 4/2015 | Tristan et al. |
| 2015/0268930 A1 | 9/2015 | Lee |
| 2016/0210718 A1 | 7/2016 | Tristan et al. |
| 2016/0224544 A1 | 8/2016 | Tristan et al. |
| 2016/0224900 A1 | 8/2016 | Steele, Jr. |
| 2016/0224902 A1 | 8/2016 | Steele, Jr. et al. |
| 2016/0350411 A1 | 12/2016 | Tristan |
| 2017/0154077 A1 | 6/2017 | Kang |

OTHER PUBLICATIONS

Tristan, U.S. Appl. No. 14/316,186, filed May 26, 2014, Advisory Action, dated Aug. 3, 2017.

U.S. Appl. No. 14/755,312, filed Jun. 30, 2015, Office Action, dated Oct. 3, 2016.

Tristan, U.S. Appl. No. 14/599,272, filed Jan. 16, 2015, Final Office Action, dated Nov. 15, 2017.

Freitas et al., "Bayesian Latent Semantic Analysis of Multimedia Databases" Technical Report, dated Oct. 22, 2001, 36 pages.

Kruschke, John. Doing Bayesian Data Analysis: A Tutorial Introduction with R . Academic Press, 2010.

Koller, D., McAllester, D., and Pfeffer, A., "Effective Bayesian Inference for Stochastic Programs". In Proceedings of the 14th National Conference on Artificial Intelligence, dated 1997, 8 pages.

Jiang et al., "A Method of Accelerating LDA Program with GPU", 2012 Third International Conference on Networking and Distributed Computing IEEE, 2012, 4 pages.

Hoffman, M., Blei, D., Wang, C., and Paisley, J. "Stochastic Variational Inference", Journal of Machine Learning Research , 14:1303-1347, dated 2013, 45 pages.

Hoffman, M. D. and Gelman, A., "The No-U-turn Sampler: Adaptively Setting Path Lengths in Hamiltonian Monte Carlo", Journal of Machine Learning Research , In press., dated Apr. 2014, 31 pages.

Hillis,W. D. and Steele, Jr., G. L., "Data Parallel Algorithms", Communications of the ACM , 29(12):1170-1183, 1986, 14 pages.

Hershey et al., "Accelerating inference:Towards a Full Language,", compiler and hardwarestack. CoRR , abs/1212.2991, 2012, 8 pages.

Griffiths et al., "Finding Scientific Topics" Colloquium, PNAS, vol. 101, dated Apr. 6, 2004, 8 pages.

Blei, David M., Ng, Andrew Y., and Jordan, Michael I. "Latent Dirichlet Allocation", Journal of Machine Learning Research, 3:993-1022, dated 2003, 30 pages.

Goodman et al., "Church: A Language for Generative Models", In Proceedings of the 24th Conference on Uncertainty in Artificial Intelligence, UAI 2008, pp. 220-229, dated 2008, 10 pages.

Lu et al., "Accelerating Topic Training on a Single Machine", APWeb dated 2013, 12 pages.

Chang et al., "Reading Tea Leaves: How Humans Interpret Topic Models" dated 2009, 9 pages.

Celeux et al., "On Stochastic Versions of the EM Algorithm", INRIA, dated Mar. 1995, 25 pages.

Blelloch, G. E. "Programming Parallel Algorithms". Communications of the ACM, 39:85-97, 1996, 13 pages.

Blei, David, "Probabilistic Topic Models", Surveying a suite of algorithms that offer a solution to managing large document archives, Apr. 2012 | vol. 55 | No. 4 | communications, AMC, 8 pages.

Blei et al., "Latent Dirichlet Allocation" Journal of Machine Learning Research 3, dated 2003, 30 pages.

Bache, K. and Lichman, M. "UCI Machine Learning Repository", 2013. URL http://archive.ics.uci.edu/ml, 2 pages.

Asuncion et al., "On Smoothing and Inference for Topic Models", UAI 2009, 8 pages.

Lunn, D., Spiegelhalter, D., Thomas, A., and Best, N. "The BUGS Project: Evolution, Critique and Future Directions", Statistics in Medicine , 2009, 19 pages.

Kiselyov, O. and Shan, C.-C. "Embedded Probabilistic Programming", In Proceedings of the IFIP TC 2 Working Conference on Domain-Specific Languages , 2009, pp. 360-384. Springer-Verlag, 25 pages.

Goodman, N. D. "The Principles and Practice of Probabilistic Programming"., Proceedings of the 40th annual ACM SIGPLAN-SIGACT Symposium on Principles of Programming Languages, dated 2013, 3 pgs.

Plummer, Martyn. Jags: "A Program for Analysis of Bayesian Graphical Models Using Gibbs Sampling", Pro. of the 3rd International Workshop on Distributed Statistical Computing, Mar. 2013, 10 pgs.

Yan et al., "Parallel Inference for Latent Dirichlet Allocation on Graphics Processing Units" dated 2009, 9 pages.

Wikipedia, "Approximate Counting Algorithm", last accesed on May 7, 2015, http://en.wikipedia.org/wiki/Approximate_counting_algorithm, 2 pages.

Wang et al., "PLDA: Parallel Latent Dirichlet Allocation for Large-Scale Applications" AAIM, dated 2009, 14 pages.

Wallach et al., "Rethinking LDA: Why Priors Matter" dated 2009, 9 pages.

Wallach et al., "Evaluation Methods for Topic Models" Proceedings of 26th International Conference on Machine Learning Monteral, Canada, dated 2009, 8 pages.

Venugopal, D. and Gogate, V. "Dynamic Blocking and Collapsing for Gibbs Sampling", In 29th Conference on Uncertainty in Artificial Intelligence , UAI'13, 2013, 10 pages.

Thomas, A., Spiegelhalter, D. J., and Gilks, W. R. "BUGS: A Program to Perform Bayesian Inference Using Gibbs Sampling". Bayesian Statistics, 4:837-842, dated 1992, Oxford University Press.

Stucki, S., Amin, N., Jonnalageda, M., and Rompf, T., "What are the Odds?" Probabilistic programming in Scala. In Scala '13 , pp. 360-384. Springer-Verlag, 2013, 9 pages.

Smola et al., "An Architecture for Parallel Topic Models" Proceedings of the VLDB Endowment, vol. 3, No. 1, dated 2010, 8 pages.

Liu et al., "PLDA+:Parallel Latent Dirichlet Allocation with Data Placement and Pipeline Processing", ACM, dated 2011, 18 pages.

Porteous et al., "Fast Collapsed Gibbs Sampling for Latent Dirichlet Allocation" KDD' dated 2008, ACM, 9 pages.

Low et al., "A New Framework for Parallel Machine Learning", CoRR , abs/1006.4990, dated 2010, 10 pages.

Pfeffer, A. Figaro: "An Object-Oriented Probabilistic Programming Language", Technical report, Charles River Analytics, dated 2009, 9 pages.

Pfeffer, A. "The Design and Implementation of IBAL: A General-Purpose Probabilistic Language", Introduction to Statistical Relational Learning , pp. 399-433, 2007, 45 pages.

Pfeffer, A. "Creating and Manipulating Probabilistic Programs With Figaro", In 2nd International Workshop on Statistical Relational AI , 2012, 10 pages.

Newman et al., "Distributed Algorithms for Topic Models", Journal of Machine Learning Research, dated 2009, 28 pages.

Neal, Radford. "CSC 2541: Bayesian Methods for Machine Learning", 2013. Lecture 3, 20 pages.

Minka, T., Winn, J.M., Guiver, J.P., and Knowles, D.A. "Infer.NET 2.5", 2012. URL http://research.microsoft.com/infernet . Microsoft Research Cambridge, 4 pages.

McCallum et al. "Probabilistic Programming Via Imperatively Defined Factorgraphs in Advances in Neural Information Processing Systems 22" , pp. 1249-1257, 2009, 9 pages.

Marsaglia, G. and Tsang, W. W. A simple method for generating gamma variables. ACM Trans. Math. Softw. , 26 (3):363-372, 2000.

Yao et al., "Efficient Methods for Topic Model Inference on Streaming Document Collections", KDD, dated 2009, ACM, 9 pages.

Rosen-Zvi et al., "Learning Author-Topic Models from Text Corpora", 2004 Uncertainty in AI Conference and the 2004 ACM SIGKDD Conference, dated 2010, AMC, 38 pages.

Tristan, U.S. Appl. No. 14/755,312, filed Jun. 30, 2015, Notice of Allowance, dated Mar. 10, 2017.

Tristan, U.S. Appl. No. 14/316,186, filed Jun. 26, 2014, Final Office Action, dated May 11, 2017.

(56) References Cited

OTHER PUBLICATIONS

Tristan, U.S. Appl. No. 14/599,272, filed Jan. 16, 2015, Advisory Action, dated Jan. 24, 2018.
Steele, U.S. Appl. No. 14/713,205, filed May 15, 2015, Office Action, dated Mar. 8, 2018.
Steele Jr, U.S. Appl. No. 14/820,169, filed Aug. 6, 2015, Office Action, dated Feb. 27, 2018.
Brown, U.S. Appl. No. 15/074,248, filed Mar. 18, 2016, Notice of Allowance, dated Apr. 24, 2018.

METHOD AND SYSTEM FOR DISTRIBUTED LATENT DIRICHLET ALLOCATION COMPUTATION USING ADDITION OF APPROXIMATE COUNTERS

CROSS-REFERENCE TO RELATED APPLICATIONS

This application is related to application Ser. No. 14/599,272, titled "DATA-PARALLEL PARAMETER ESTIMATION OF THE LATENT DIRICHLET ALLOCATION MODEL BY GREEDY GIBBS SAMPLING", filed Jan. 16, 2015, the entire contents of which is hereby incorporated by reference as if fully set forth herein. This application is also related to application Ser. No. 14/820,169, titled "METHOD AND SYSTEM FOR LATENT DIRICHLET ALLOCATION COMPUTATION USING APPROXIMATE COUNTERS"), filed Aug. 6, 2015, the entire contents of which is hereby incorporated by reference as if fully set forth herein.

FIELD OF THE INVENTION

The present invention relates to a distributed system performing automatic and unsupervised discovery of topics in unlabeled data, and, more specifically, to adding approximate counter values for a distributed implementation of an LDA Gibbs sampler.

BACKGROUND

A topic model—which is a probabilistic model for unlabeled data—may be used for the automatic and unsupervised discovery of topics in unlabeled data, such as a set of textual documents. Such a topic model is designed with the underlying assumption that words belong to sets of topics, where a topic is a set of words. For example, given a set of scientific papers, a topic model can be used to discover words that occur together (and therefore can be clustered under the same a topic). One topic could include words such as "neuroscience" and "synapse", while another topic could include words such as "graviton" and "boson".

Topic modeling has many applications in natural language processing. For example, topic modeling can be a key part of text analytics such as Name Entity Recognition, Part-of-Speech Tagging, retrieval of information for search engines, etc. The automatic and unsupervised discovery of topics in unlabeled data may be used to improve the performance of various kinds of classifiers (such as sentiment analysis) and natural language processing applications.

Topic modeling being unsupervised is both a blessing and a curse. It is a blessing because good labeled data is a scarce resource, so improving tools that depend on labeled data by extracting knowledge from the vast amounts of unlabeled data is very useful. It is a curse because the methods used to discover topics are generally computationally intensive, and topic modeling often needs to be applied on significant amounts of data, sometimes under time constraints.

Given the considerable computational potential of latest editions of highly-parallel architectures and their potential for even more computational power, it is tempting to choose such architectures to perform topic modeling. Further, topic modeling can be performed even more quickly when performed by a distributed system of computing devices with GPUs. Dividing the topic modeling into tasks for the nodes in a distributed system to perform combines the computing power of the multiple nodes, which can speed up the topic modeling. However, splitting up the topic modeling tasks among computing devices introduces the need for inter-device communication, which is very slow compared to a GPU's processing speed and which provides a significant hurdle in efficiently implementing a distributed topic modeling algorithm.

As such, it would be beneficial to implement a topic modeling algorithm that is highly data-parallel, and that effectively manages memory and communication bandwidth in order to efficiently perform a parallelized topic modeling on a distributed system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
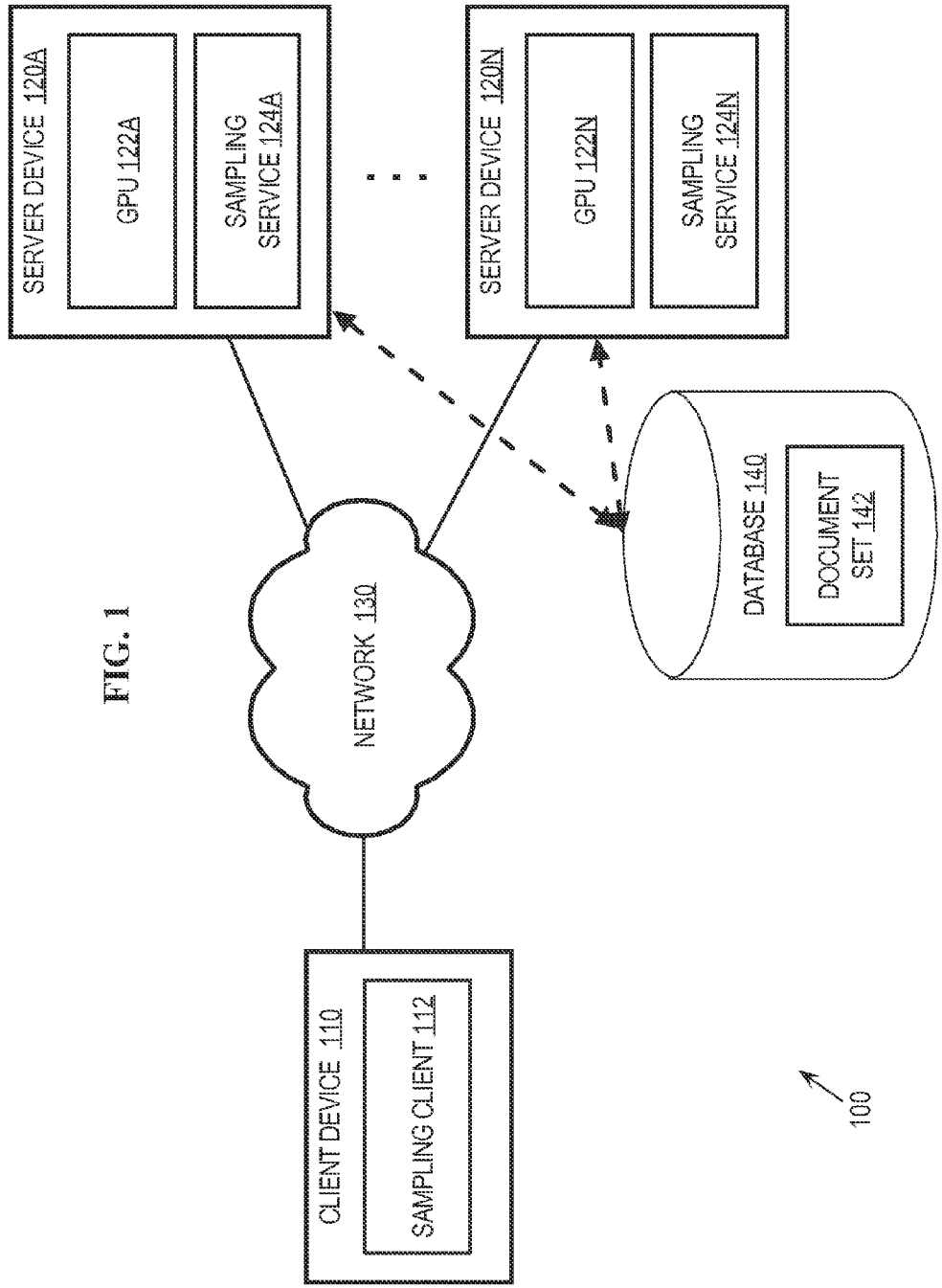
FIG. 1 is a block diagram that depicts an example network arrangement for a highly-parallel model sampling distributed system with reduced memory and communication bandwidth requirements.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is described a data-parallel algorithm for topic modeling on a distributed system in which the memory and communication bandwidth requirements are streamlined for distributed implementation. More specifically, an algorithm for LDA Gibbs sampling that uses approximate counters rather than conventional counters is described for implementation on a distributed system.

According to embodiments, a distributed LDA Gibbs sampling algorithm shares approximate counter values amongst the nodes of a distributed system. These approximate counter values are repeatedly aggregated and then shared again to perform the distributed LDA Gibbs sampling. In order to maintain the shared counter values as approximate counter values of at most 16 bits, with many embodiments using approximate counters represented by eight bits or less, approximate counter values are summed to produce aggregate approximate counter values. These eight-bit aggregate approximate counter values are shared between the nodes of the distributed system. As such, the size of the inter-node communications used to share the counter values is dramatically reduced—when compared to communications of 32-bit integer counter values—and the processing speed of the distributed LDA Gibbs sampling algorithm is less hampered by communication bandwidth issues.

As such, the addition of various types of approximate counters is described herein. Specifically, addition of binary Morris approximate counters, general Morris approximate counters, and Csűrös approximate counters are described in the context of distributed implementations of an LDA Gibbs sampling algorithm. According to embodiments, one or more of binary Morris approximate counter values, general Morris approximate counter values, and Csűrös approximate counter values are communicated between nodes of a distributed system implementing distributed LDA Gibbs sampling to streamline communication bandwidth requirements.

For purposes of illustration, embodiments are described in the context of running, on a GPU, an uncollapsed Gibbs sampler (such as the Greedy Gibbs sampler presented in application Ser. No. 14/599,272) on an LDA statistical model. Uncollapsed Gibbs samplers do not require counters to be decremented (as do collapsed Gibbs samplers), and as such, approximate counters may be implemented for uncollapsed Gibbs samplers utilizing the well-known "increment" and "clear" functions of such counters. According to an embodiment, an uncollapsed Gibbs sampler has at least one variable uncollapsed. According to an embodiment, an uncollapsed Gibbs sampler has both $\phi$ and $\theta$ values uncollapsed.

Nevertheless, embodiments are not limited to the Greedy Gibbs sampler, or even an uncollapsed Gibbs sampler. Furthermore, embodiments are not limited to LDA. Embodiments are applicable to efficiently implement topic modeling for other large mixture models or clustering algorithms, such as Pachinko allocation, and probabilistic latent semantic indexing (PLSI), etc. Embodiments may also be applicable to distributed implementations of machine learning algorithms other than LDA that maintain tables of counters. Embodiments may also be applicable to distributed implementations of other algorithms, including those outside machine learning (for example, the distributed maintenance and subsequent aggregation of performance counters).

Architecture for Sparse Model Sampling

FIG. 1 is a block diagram that depicts an example network arrangement 100 for a highly-parallel model sampling distributed system with reduced memory and communication bandwidth requirements, according to embodiments. Network arrangement 100 includes a client device 110 and server devices 120A-N communicatively coupled via a network 130. Example network arrangement 100 may include other devices, including client devices, server devices, cluster nodes, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a sampling client 112. Sampling client 112 may be implemented in any number of ways, including as a stand-alone application running on client device 110, as a plugin to a browser running at client device 110, etc. Sampling client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server devices 120A-N. Furthermore, network 130 may facilitate use of any type of communications protocol, and may be secured or unsecured, depending upon the requirements of a particular embodiment.

Server devices 120A-N represent two or more server devices, each of which may be implemented by any type of computing device that is configured with a GPU and is capable of communicating over network 130. Server devices 120A-N are capable of collectively functioning as a distributed system, and as such, server devices 120A-N are collectively referred to herein as distributed system 120. Furthermore, according to embodiments, at least two devices of server devices 120A-N are physically distinct from each other and do not share any hardware.

In network arrangement 100, server devices 120A-N are each configured with a GPU (GPUs 122A-N) and a sampling service (sampling services 124A-N), described in further detail below. According to embodiments, a particular sampling service (e.g., sampling service 124A) runs an LDA Gibbs sampling algorithm on the corresponding GPU (e.g., GPU 122A). Any of the functionality attributed to GPUs 122A-N and/or sampling services 124A-N herein may be performed by another entity running on server devices 120A-N, or by a GPU or other entity on client device 110 or on other devices that are communicatively coupled to network 130, according to embodiments. Server devices 120A-N may be configured with other mechanisms, hardware, processes, and functionalities, depending upon a particular implementation.

One or more of server devices 120A-N are communicatively coupled to a database 140. Database 140 maintains information for a document set 142. Database 140 may reside in any type of storage, including volatile and non-volatile storage (e.g., random access memory (RAM), a removable or disk drive, main memory, etc.), and may be implemented by one or more logical databases. The storage on which database 140 resides may be external or internal to one or more of server devices 120A-N.

Sampling client 112 and/or any of sampling services 124A-N may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, sampling client 112 and/or sampling services 124A-N may send one or more communications, using any of the above protocols or any other communication protocol, over network 130 to other entities communicatively coupled to network 130, according to embodiments.

In an embodiment, each of the processes described in connection with any of sampling client 112, GPUs 122A-N, and/or sampling services 124A-N are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Cloud Computing System

According to embodiments, server devices 120A-N are part of a cloud or clustered computing system. A cloud or clustered computing system is a computing system that includes a collection of hardware and software components that function together to provide functionality such as, for example, storing data, processing commands, and/or providing services (such as the services described herein in connection with sampling services 124A-N). In the context of the cloud computing system, server devices 120A-N are distinct active functional components that work together to accomplish a particular task that the cloud computing system is requested to perform. According to embodiments, other distinct active functional components that are also part of the system provide the same functionality in parallel.

Underlying logical components of the cloud system may be replaced by different logical components without affecting the overall functionality of the cloud system. The complexity of the cloud system may be hidden from a client of the cloud system, such as a user or application, such that the client (i.e., operating at client device 110) may not even need to be aware which software or hardware is being used by the system, as long as the functionality is provided from the system to the client.

To shield the client from the complexities of the cloud, many cloud systems include a client interface (e.g., at sampling client 112), and a component interface. The client interface exposes simple commands to the client in the form of an interface such as an application programming interface or a graphical user interface. The commands expose functionality of the cloud system to the client such that, when the cloud system receives commands from the client on the client interface, the cloud system carries out the requested function using one or more of a variety of functional components, such as one or more of server devices 120A-N, that may be hidden from the client. Several clients may be serviced by the cloud system in parallel using parallel instances of the client interface.

Optimizing Memory Usage

Embodiments describe implementing a distributed LDA Gibbs algorithm on a distributed system 120, the nodes of which are configured with GPUs 122A-N. The GPU architecture is a prime example of a highly-parallel architecture with the potential for considerable computational power. Nevertheless, embodiments may or may not be implemented on a GPU. For example, embodiments are applicable to distributed architectures, whether SIMD, MIMD, or cluster-of-SIMD in nature.

There are several challenges in efficiently using a GPU for machine learning. For example, GPUs are composed of many Single Program Multiple Data (SPMD) units which have the use of small amounts of memory, and with enough parallelism, memory bandwidth becomes a bottleneck. Thus, one challenge of effective GPU implementation of an uncollapsed Gibbs sampler is decreasing total memory usage in order to effectively use GPU resources to implement the Gibbs sampler. After all, the scalability of an uncollapsed Gibbs sampler is useful only if there is enough memory to hold the large count matrices used in the Gibbs sampler.

In order to decrease the amount of memory required for the tasks of an LDA Gibbs sampler, approximate counters are substituted for more conventional counters that are generally used in these tasks. Based on the replacement of 32-bit entries (integer counters) in large counter arrays used in LDA Gibbs sampling with 16-bit or smaller entries (approximate counters), embodiments allow handling of significantly larger problem sizes than the more conventional algorithm since the somewhat limited GPU memory is used more efficiently.

According to embodiments, approximate counter values are represented using no more than eight bits. However, according to other embodiments, approximate counter values (as described herein) are represented using up to 16 bits. For some very large data sets, an eight-bit representation of approximate counter values may be too coarse to properly represent counters generated based on the data in such large data sets, e.g., in the context of an LDA Gibbs algorithm as described herein. Approximate counter values represented by more than eight bits (i.e., up to 16 bits) are utilized for such large data sets to allow for more reasonable expected values for the applicable approximate counters. As such, alternative embodiments (i.e., that are alternatives to embodiments describing approximate counter values represented by eight or fewer bits herein) comprise approximate counter values represented by at most 16 bits.

An approximate counter is a probabilistic counting algorithm that uses probabilistic techniques to increment the counter. The intuitive idea of an approximate counter is that it estimates the order of magnitude of the number of increments to the counter. More specifically, an approximate counter uses a randomized strategy to implement an "increment" operation so that the integer value of the counter is approximately the logarithm of the number of prior incrementation attempts. The idea of incrementing approximate counters probabilistically can be adjusted in different ways to allow for different levels of precision (according to Morris approximate counters) or to have a behavior similar to that of a floating-point number representation (according to Csűrös approximate counters).

For more information on Morris and Csűrös approximate counters, see the following two documents, the contents of each of which are incorporated herein by reference: Robert Morris. Counting large numbers of events in small registers. *Commun. ACM*, 21(10):840-842, October 1978. Miklós Csűrös. Approximate counting with a floating-point counter. In *Proceedings of the 16th Annual International Conference on Computing and Combinatorics*, COCOON '10, pages 358-367, Berlin, Heidelberg, 2010. Springer-Verlag.)

As a simple example, to increment an approximate counter whose current value is X, the approximate counter increments X with a probability $2^{-X}$, and otherwise the count is not incremented. In the end, a statistically reasonable estimate of the number of incrementation attempts on the approximate counter (referred to herein as "expected value") since the approximate counter was last "cleared" (or set to zero) is $2^X - 1$.

Approximate Counters in Distributed Gibbs Sampling

As described above, embodiments run an uncollapsed Gibbs sampler, using approximate counters, in a distributed system. Performance of a distributed version of an uncollapsed Gibbs sampler requires inter-node communication, and because of bandwidth limitations that are inherent in communication media (e.g., network 130 of FIG. 1), the needed communication can create a bottleneck that slows processing by the distributed system.

To streamline memory requirements and message size, embodiments replace 32-bit conventional counter values with 8-bit (or less) approximate counter values in the inter-node communications required by the distributed implementation of LDA Gibbs sampling. The streamlined memory and inter-node bandwidth required for embodiments allows the distributed algorithm to run approximately 25% faster than even a Greedy Gibbs sampler (which is already highly optimized) that uses conventional counters and running on the same distributed cluster of GPU-enabled processing nodes, such as server devices 120A-N (which, for example, comprise a cluster of four nodes, each having an Intel Core-i7 4820k CPU and two NVIDIA Titan Black GPU processors).

To illustrate implementation of distributed LDA Gibbs samplers—using approximate counters—on a distributed system, the following Gibbs samplers are described below: a collapsed Gibbs sampler with no accompanying pseudocode; Pseudocode I that describes an uncollapsed Gibbs sampler using conventional counters; Pseudocode II that describes a distributed implementation of an uncollapsed Gibbs sampler using conventional counters; Pseudocode III that describes a distributed implementation of an uncollapsed Gibbs sampler using binary Morris approximate counters; Pseudocode IV that describes a distributed implementation of an uncollapsed Gibbs sampler using general Morris approximate counters; and Pseudocode V that describes a distributed implementation of an uncollapsed Gibbs sampler using Csűrös approximate counters. To be clear, Pseudocodes I and II do not describe using or aggregating approximate counters as do Pseudocodes III, IV, and V. Many of the features of each pseudocode is shared among one or more of the other pseudocodes. Inasmuch as the features are shared, the description of features of one pseudocode is applicable to those shared features in the other pseudocodes.

Collapsed Gibbs Sampler

In collapsed Gibbs sampling, four arrays are maintained (in addition to the actual text corpus w, which is also an array). The array z is a two-dimensional ragged array indexed by document number and word occurrence within the document, which for each word occurrence in each document records the (integer) number of the topic that has been (provisionally) assigned to that word. The other arrays contain counters that summarize the contents of the z array in various ways. The array topicCounts is a two-dimensional array of counters indexed by topic number and word within a vocabulary, and it records, for each topic and word, how many occurrences of that word in the document corpus have been assigned that topic. Similarly, documentCounts is a two-dimensional array of counters indexed by document number and topic number, and it records, for each topic and document, how many word occurrences in that document have been assigned that topic.

The last of the four arrays is a summary array of counters topicAssignments that may also be maintained such that topicAssignments[j]=$\Sigma_v$ topicCounts[v,j]. At each step a new value is randomly chosen for some element of z, where the relative probabilities of the possible values (topic numbers) are calculated by examining counter values in topicCounts and documentCounts. A newly chosen z value represents a new random choice j' of topic (replacing a previous value j) for a given word v occurring in a given document m; after that value is chosen, counters topicCounts[v,j], topicAssignments[j], and documentCounts[m,j] are decremented, and then counters topicCounts[v,j'], topicAssignments[j'], and documentCounts[m, j'] are incremented. Typically these counters are 32-bit integer counters.

The collapsed Gibbs sampling strategy is sequential. It is important that elements of z be processed sequentially, so that after a new z value is chosen, the counters are updated before the next new z value is chosen. If the z values are not processed sequentially, then the computation typically requires many more iterations to converge, and moreover the quality of the computed result suffers. This requirement for sequential processing is the motivation for maintaining the counters incrementally using both increment and decrement operations; it is infeasible to only use increment operations on the counters for a collapsed Gibbs sampler because it would be computationally expensive to reset the counters to zero and then recompute the counter values from scratch after every change to the z array.

Uncollapsed Gibbs Sampler

In uncollapsed Gibbs sampling, two arrays θ and φ of floating-point parameters are maintained in addition to the four arrays already described in connection with collapsed Gibbs sampling. Each overall iteration of the computation of an uncollapsed Gibbs sampler first clears the arrays of counters, then processes the entire z array at once, choosing new values for every element of z independently (and therefore possibly in parallel).

The relative probabilities of the possible values (topic numbers) are calculated not by examining counter values in topicCounts and documentCounts, but by examining the arrays θ and φ. As new z values are chosen, counter values are also updated, but using only increment operations (and not decrement operations, since it is never necessary to decrement a counter in uncollapsed Gibbs sampling). After all new z values have been chosen (and therefore the arrays of counters have also been completely computed), then new values for the elements of the θ and φ arrays are computed from the arrays of counters.

Figure 2:
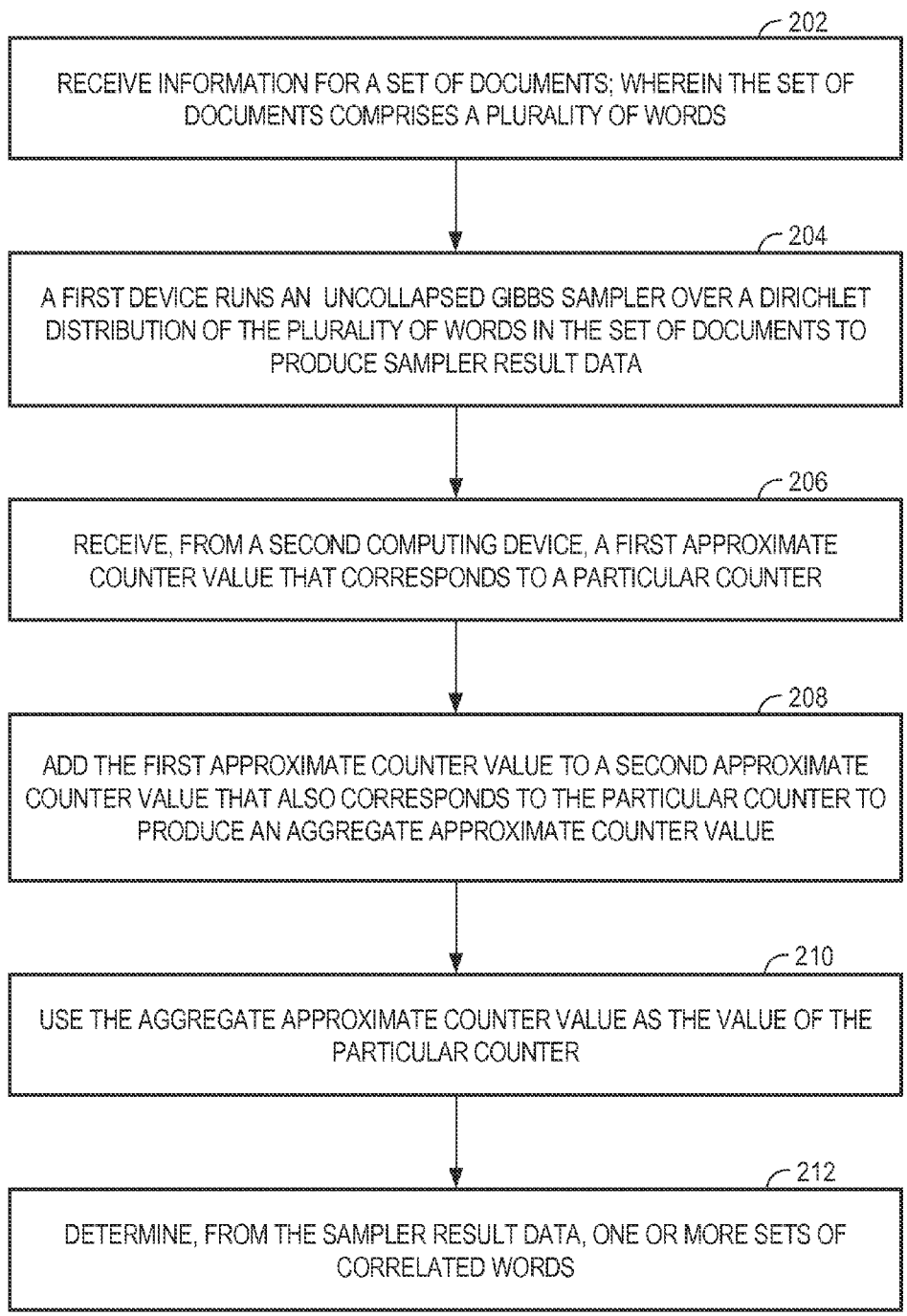
FIG. 2 depicts a flowchart for adding approximate count values from multiple devices to produce an aggregated approximate count value.

FIG. 2 depicts a flowchart 200 for adding approximate count values from multiple devices, in connection with running an uncollapsed Gibbs sampler, to produce an aggregated approximate count value. At step 202 of flowchart 200, information for a set of documents is received; wherein the set of documents comprises a plurality of words. For example, a user provides information about document set 142 (database 140) to sampling client 112 (client device 110). In this example, document set 142 is a set of web pages gathered by a web crawler. Sampling client 112 provides the information to sampling service 124 (of server devices 120A-N).

Document set 142 includes one or more documents, which is a set of unlabeled data, where each document includes words. As such, each particular document in document set 142 includes words that may be correlated by a Gibbs sampler. According to an embodiment, a user also provides sampling service 124 a number of topics (K) into which the Gibbs sampler should correlate the words from document set 142.

In connection with the following pseudocode, including Pseudocode I, let M be the number of documents, K be the number of topics, and V be the size of the vocabulary, which is a set of distinct words found within the document set. More specifically, each document is a list of occurrences of words, each of which belongs to the vocabulary; any given word can appear in any number of documents, and may appear any number of times in any single document. The documents may be of different lengths.

In the phase of Gibbs sampling that draws new z values, given θ and φ values, the uncollapsed Gibbs sampler increments counters selected by the new z values. Because no z value depends on any other z value in an uncollapsed Gibbs sampler, new z values may all be computed independently (and therefore in parallel to any extent desired).

It is assumed that the matrix θ is a M×K matrix and the matrix φ is a V×K matrix. It is also assumed that the elements of these matrices are non-negative numbers, typically represented in a computer as floating-point values. The following are also assumed to be given: (i) a length-M vector of nonnegative integers N such that N[m] is the length of document m; and (ii) an M×N ragged array w (i.e., where, for 0≤m<M, w[m] is a vector of length N[m]). (Zero-based indexing is used throughout this document.) Each element of w is less than V and may therefore be used as a first index for $\phi$.

Given K, M, V, N, $\phi$, $\theta$, and w and using two temporary M×N×K ragged work arrays a and p, a Gibbs sampler computes all of the elements for a M×N ragged array z as follows: For all m such that 0≤m<M and for all i such that 0≤i<N[m], a Gibbs sampler performs both of:

first, for all k such that 0≤k<K, let a[m][i][k]=$\theta$[m, k]×$\phi$[w[m, i], k];

second, let z[m, i] be a nonnegative integer less than K, chosen randomly in such a way that the probability of choosing the value k' is a[m][i][k']/$\sigma$ where $\sigma=\Sigma_{0 \leq k<K}$ a[m][i][k]. (Thus, a[m][i][k'] is a relative (non-normalized) probability, and a[m][i][k']/$\sigma$ is an absolute (normalized) probability.)

Then, after the Gibbs sampler chooses a value j for z[m, i], the sampler increments three counters that are elements of three respective arrays of integer counters, respectively called topicCounts, topicAssignments, and documentCounts. For each of the three arrays, the value j is used as part of the process of selecting the specific counter to be incremented. Typically each of these counters, implemented conventionally, is 32 bits in size.

The following pseudocode, referred to as "Pseudocode I" describes a version of such an algorithm, i.e., an uncompressed Gibbs sampler implementing conventional counters. In the pseudocode, a "let" statement creates a local binding of a scalar (single-valued) variable and gives it a value, a "local array" declaration creates a local binding of an array variable (containing an element value for each indexable position in the array), and distinct iterations of a "for" or "for all" construct are understood to create distinct and independent instantiations of such local variables for each iteration. The iterations of a "for" construct are understood to be executed sequentially in a specific order, and this is emphasized in the pseudocode by the use of the word "sequentially". However, the iterations of a "for all" construct are intended to be computationally independent and therefore, according to embodiments, may be executed in any order, or in parallel, or in any sequential-parallel combination. Also, statements after "//" symbols are comments on the pseudocode that are included for purposes of illustration of the pseudocode.

```
1:   // "Pseudocode I" describing a straightforward algorithm for
     drawing new z values
2:   procedure DrawZ (K, M, V, N[M], θ[M, K], ϕ[V, K],
     w[M][N]; output z[M, N])
3:       local array a[M][N][K], p[M][N][K]
4:       for all 0 ≤ m < M do
5:           for all 0 ≤ i < N[m] do
6:               //Compute θ-ϕ products
7:               for all 0 ≤ k < K do
8:                   a[m][i][k] ← θ[m, k] × ϕ[w[m][i], k]
9:               end for
10:              //Compute partial sums of the products
11:              begin
12:                  let sum ← 0.0
13:                  for k sequentially from 0 through K − 1 do
14:                      sum ← sum + a[m][i][k]
15:                      p[m][i][k] ← sum
16:                  end for
17:              end
18:              //Search the table of partial sums
19:              begin
20:                  let u ← random value chosen uniformly
                     from the real interval [0.0, 1.0)
21:                  let stop ← sum × u
22:                  let j ← 0
23:                  //Linear search of table p[m][i]
24:                  while j < K − 1 and stop ≥ p[m][i][j] do
25:                      j ← j + 1
26:                  end while
27:                  z[m, i] ← j
28:              end
29:              //Increment three counters
30:              atomically topicCounts[w[m][i]][j] ←
                     topicCounts[w[m][i]][j] + 1
31:              atomically topicAssignments[j] ←
                     topicAssignments[j] + 1
32:              atomically documentCounts[m][j] ←
                     documentCounts[m][j] + 1
33:          end for
34:      end for
35:  end procedure
```

The computation of the $\theta$-$\phi$ products (Pseudocode I, lines 7-9) is straightforward. The computation of partial sums (Pseudocode I, lines 11-17) is sequential. The variable sum accumulates the products, and successive values of sum are stored into the array p.

A random integer is chosen for z[m, i] by choosing a random value uniformly from the range [0.0, 1.0), scaling it by the final value of sum (which has the same algorithmic effect as dividing p[m][i][k] by that value, for all 0≤k<K, to turn it into an absolute probability), and then searching the subarray p[m][i] to find the smallest entry that is larger than the scaled random value (and if there are several such entries, all equal, then the one with the smallest index is chosen); the index k of that entry is used as the desired randomly chosen integer. (See Pseudocode I, lines 19-28.) Note that because all elements of $\theta$ and $\phi$ are nonnegative, the products stored in a are also nonnegative, and therefore each subarray p[m][i] is monotonically nondecreasing; that is, for all 0≤m<M, 0≤i<N[m], and 0<k<K, it is true that p[m][i][k−1]≤p[m][i][k].

Once an integer value j has been chosen as the topic z[m, i] for word i of document m, three counters are incremented—one counter within each of three arrays of counters (see Pseudocode I, lines 30-32). The array topicCounts keeps track, for each word in the vocabulary and for each topic, how many times that word has been assigned to that topic. The array topicAssignments keeps track, for each topic, how many times that topic has been assigned to any word. The array documentCounts keeps track, for each document and each topic, how many distinct word occurrences in that document have been assigned to that topic. If iterations of the "for all" loops in the algorithm are executed in parallel, then it is necessary to perform the incrementations using atomic assignments.

In an embodiment, the "for all" loop on m (starting on Pseudocode I, line 4) executes its iterations partly or entirely in parallel, but the "for all" loop on i (starting on Pseudocode I, line 5) executes its iterations sequentially, and therefore incrementation of an element of the documentCounts array does not require the use of an atomic assignment or other synchronization facility, so that the statement on line 32 of Pseudocode I may be written simply as:

documentCounts[$m$][$j$]←documentCounts[$m$][$j$]+1

After the "DrawZ" procedure has completed, other parts of the code read the values of the counters in these arrays and use these values for further computations, for example to draw new values for the $\theta$ and $\phi$ arrays.

Distributed LDA Gibbs Sampler

In the case where a data set (such as document set 142) is too large to be analyzed by a single computing device (such as server device 120A), a distributed system comprising multiple computing devices (such as distributed system 120) can share processing of the data, thereby using the processing power of the multiple devices to solve a single problem. For example, if there are eight nodes in distributed system 120, then each node in the system processes a distinct portion of document set 142, e.g., ⅛ of the documents in document set 142. Each node in distributed system 120 performs iterations of the LDA Gibbs algorithm on its portion of document set 142. At each iteration, the counts for the system must be known by the entire system.

In a distributed implementation of an LDA Gibbs algorithm, there are two possible approaches to representing counters in the arrays of counters used by the computation: either counters are replicated, or they are not. If counters are not replicated, then the array of counters may be either stored on one node, or carved up so that counters are stored on more than one node; in either case, sometimes incrementing a counter requires that a node increment a counter that is not stored on that node, thus requiring internode communication. If counters are replicated, then the need for internode communication during incrementation can be reduced, or even eliminated if every node has a copy of every counter; however, when counters are replicated, an additional step is required such that, at every iteration of the LDA Gibbs algorithm, the distributed system adds up—for each counter—all of the replicated copies of the counter to produce the true final total for that counter.

Experiments show that using a fully replicated representation of counters, one copy per node, can provide superior overall performance for a distributed LDA Gibbs algorithm. As such, embodiments implement a distributed LDA Gibbs algorithm in which each node of the system (i.e., each of server devices 120A-N) maintains a full representation of the counters for the algorithm. When each node of the system maintains a full representation of the counters for the algorithm, the nodes of distributed system 120 perform each iteration of the LDA Gibbs sampler independently of each other. As such, the counts at each node are calculated independently of the data being processed at the other nodes in distributed system 120.

At step 204 of flowchart 200, a first computing device runs an uncollapsed Gibbs sampler over a Dirichlet distribution of the plurality of words in the set of documents to produce sampler result data. For example, sampling service 124A (on server device 120A) runs an uncollapsed Gibbs sampler, such as the sampler described in Pseudocodes II, III, IV, or V. The following pseudocode, referred to herein as "Pseudocode II" describes an uncompressed Gibbs sampler running on a distributed system—and using conventional counters—that draws values for z and sums counters across nodes in the distributed system.

In the context of Pseudocode II, the following simplification is assumed for purposes of illustration: K is a multiple of NumberOfNodes, and NumberOfNodes is a power of two. This is a non-limiting simplification, and embodiments comprise distributed systems with any number of nodes (including numbers that are not powers of two) and identifying any number of topics (including numbers of topics that are not exact multiples of the number of nodes).

```
1:   // "Pseudocode II" describing a Distributed algorithm for drawing z, then summing counters
     across nodes
2:   procedure DrawZ (K, M, V, N[M], θ[M, K], φ[V, K], w[M][N]; output z[M, N])
3:       local array a[M][N][K], p[M][N][K]
4:       for all 0 ≤ m < M do
5:           for all 0 ≤ i < N[m] do
6:               //Compute θ-φ products
7:               for all 0 ≤ k < K do
8:                   a[m][i][k] ← θ[m, k] × φ[w[m][i], k]
9:               end for
10:              //Compute partial sums of the products
11:              begin
12:                  let sum ← 0.0
13:                  for k sequentially from 0 through K − 1 do
14:                      sum ← sum + a[m][i][k]
15:                      p[m][i][k] ← sum
16:                  end for
17:              end
18:              //Search the table of partial sums
19:              begin
20:                  let u ← random value chosen uniformly from the real interval [0.0, 1.0)
21:                  let stop ← sum × u
22:                  let j ← 0
23:                  //Linear search of table p[m][i]
24:                  while j < K − 1 and stop ≥ p[m][i][j] do
25:                      j ← j + 1
26:                  end while
27:                  z[m, i] ← j
28:              end
29:              //Increment three counters
30:              atomically topicCounts[w[m][i]][j] ← topicCounts[w[m][i]][j] + 1
31:              atomically topicAssignments[j] ← topicAssignments[j] + 1
32:              atomically documentCounts[m][j] ← documentCounts[m][j] + 1
33:          end for
34:      end for
35:      //We assume that NumberOfNodes is a power of 2
36:      let L ← log₂ numberOfNodes
37:      //The nodes exchange data according to a standard hypercube pattern, computing sums.
38:      for k sequentially from 1 through L do
39:          let otherNodeNumber ← myNodeNumber ⊕ 2^(k−1)
40:          //We assume that K is a multiple of NumberOfNodes
41:          let B ← (K/numberOfNodes) << (L − k)
42:          let myBlock ← B · bitReverse(myNodeNumber & ((1 << k) − 1), k)
```

```
43:     let otherBlock ← B · bitReverse(otherNodeNumber & ((1 << k) − 1), k)
44:     local array topicCountsRemote[V, B]
45:     local array topicAssignmentsRemote[B]
46:     local array documentCountsRemote[M, B]
47:     send topicCounts[:, otherBlock : otherBlock + B − 1] to node otherNodeNumber
48:         and receive data from that node into topicCountsRemote
49:     send topicAssignments[otherBlock : otherBlock + B − 1] to node otherNodeNumber
50:         and receive data from that node into topicAssignmentsRemote
51:     send documentCounts[:, otherBlock : otherBlock + B − 1] to node otherNodeNumber
52:         and receive data from that node into documentCountsRemote
53:     for all 0 ≤ j < B do
54:         let y ← myBlock + j
55:         for all 0 ≤ v < V do
56:             topicCounts[v, y] ← topicCounts[v, y] + topicCountsRemote[v, j]
57:         end for
58:         topicAssignments[y] ← topicAssignments[y] + topicAssignmentsRemote[j]
59:         for all 0 ≤ m < M do
60:             documentCounts[m, y] ← documentCounts[m, y] +
                        documentCountsRemote[m, j]
61:         end for
62:     end for
63: end for
64: //The nodes exchange data according to a standard hypercube pattern, broadcasting the
            sums.
65: for k sequentially downward from L through 1 do
66:     let otherNodeNumber ← myNodeNumber ⊕ 2^(k−1)
67:     //We assume that K is a multiple of NumberOfNodes
68:     let B ← (K/numberOfNodes) << (L − k)
69:     let myBlock ← B · bitReverse(myNodeNumber & ((1 << k) − 1), k)
70:     let otherBlock ← B · bitReverse(otherNodeNumber & ((1 << k) − 1), k)
71:     send topicCounts[:, myBlock : myBlock + B − 1] to node otherNodeNumber
72:         and receive data from that node into topicCounts[:, otherBlock : otherBlock + B −
                1]
73:     send topicAssignments[myBlock : myBlock + B − 1] to node otherNodeNumber
74:         and receive data from that node into topicAssignments[otherBlock : otherBlock +
                B − 1]
75:     send documentCounts[:, myBlock : myBlock + B − 1] to node otherNodeNumber
76:         and receive data from that node into documentCounts[:, otherBlock : otherBlock
                + B − 1]
77: end for
78: end procedure
```

Line 47 of Pseudocode II includes the following notation: "topicCounts[:, otherBlock:otherBlock+B−1]". This notation indicates that the result of the array reference is itself an array, and for each index position the indicated range of indices (or all possible indices, if only a single colon appears) are used to index the source array, and for each such index position the result array has a corresponding index position that can be indexed by that same set of indices. As a simple example, if A is a 10-by-10 array, then A[1:3, 4:7] is a 3 by 4 array consisting of the following values:

A[1, 4] A[1, 5] A[1, 6] A[1, 7]
A[2, 4] A[2, 5] A[2, 6] A[2, 7]
A[3, 4] A[3, 5] A[3, 6] A[3, 7]

As a further example, A[:, 3:7] is a 10-by-5 array consisting of the following values:

A[0, 3] A[0, 4] A[0, 5] A[0, 6] A[0, 7]
A[1, 3] A[1, 4] A[1, 5] A[1, 6] A[1, 7]
A[2, 3] A[2, 4] A[2, 5] A[2, 6] A[2, 7]
A[3, 3] A[3, 4] A[3, 5] A[3, 6] A[3, 7]
A[4, 3] A[4, 4] A[4, 5] A[4, 6] A[4, 7]
A[5, 3] A[5, 4] A[5, 5] A[5, 6] A[5, 7]
A[6, 3] A[6, 4] A[6, 5] A[6, 6] A[6, 7]
A[7, 3] A[7, 4] A[7, 5] A[7, 6] A[7, 7]
A[8, 3] A[8, 4] A[8, 5] A[8, 6] A[8, 7]
A[9, 3] A[9, 4] A[9, 5] A[9, 6] A[9, 7]

As depicted in Pseudocode II, the tasks of adding counter values, produced by an iteration of the Gibbs sampler performed by each node in distributed system 120, are distributed amongst the nodes of distributed system 120. As such, the counter values are repeatedly shared amongst the nodes and added by each node.

More particularly, the code in lines 4-34 of Pseudocode II is identical to Pseudocode I. Following that portion of the pseudocode are two more major steps involving the exchange of data amongst nodes of the system. For purposes of data exchange, each of the three fully replicated arrays topicCounts, topicAssignments, and documentCounts, on each node of distributed system 120, is regarded as being logically divided into as many chunks as there are nodes. This logical division is described in further detail below. In each of the two additional major steps, the nodes exchange data from each of their three arrays according to a hypercube pattern. Each of the major steps has L substeps, where L is the base-2 logarithm of the number of nodes. In each substep, nodes are paired in a certain way, and the two nodes in each pair exchange data.

In the first major step, the variable k controlled by the sequential "for" loop on lines 38-63 of Pseudocode II takes on the values 1, 2, ..., L−1, L in that order. On each iteration of this loop, two nodes are paired if their node numbers are the same except for bit k−1, where bit 0 is the least significant bit. To put it another way, each node can compute the node number of the "other" node with which it is paired by computing the bitwise exclusive or (XOR) of its own node number with $2^{k-1}$. Exactly this computation is performed in line 39 of Pseudocode II, using the operator "⊕" to perform a bitwise XOR, so that each node has, in its variable named otherNodeNumber, the number of the node with which it is paired for that substep.

In the first substep, for each array, each node sends half of its array to its paired node, and receives half of that node's array. This simultaneous two-way transfer of data between paired nodes is indicated by a "send and receive" statement. This is done in such a way that the node whose number is lower has the lower half each of array and the node whose number is higher has the upper half of each array. Each node then adds corresponding elements of these half-arrays.

In the second substep (if L>1), for each array, each node sends half of the resulting half-array array to its paired node, and receives half of that node's half-array; that is, they each send and receive one-quarter of an array. This is done in such a way that the node whose number is lower has the lower half each of half-array and the node whose number is higher has the upper half of each half-array. Each node then adds corresponding elements of these quarter-arrays.

Subsequent substeps proceed in like manner, so that on each substep, for each array, each node sends and receives $$\frac{1}{2^k}$$

of that array, and then sums corresponding elements of array sections of that size. On the last substep, for each array, each node sends and receives $$\frac{1}{2^L}$$

of that array and then sums corresponding elements of array sections of that size.

The final result of the first additional major step is that for each of the three arrays, for every position in that array, some node holds the sum of all the corresponding elements of that array that were originally held on all the nodes.

In the second major step, the variable k controlled by the sequential "for" loop on lines 65-77 of Pseudocode II takes on the values L, L−1, . . . , 2, 1 in that order. On each iteration of this loop, two nodes are paired if their node numbers are the same except for bit k−1, where bit 0 is the least significant bit. To put it another way, each node can compute the node number of the "other" node with which it is paired by computing the bitwise exclusive or (XOR) of its own node number with $2^{k-1}$. Exactly this computation is performed in line 66 of Pseudocode II, using the operator "⊕" to perform a bitwise XOR, so that each node has, in its variable named otherNodeNumber, the number of the node with which it is paired for that substep.

In the first substep, for each array, each node sends $$\frac{1}{2^L}$$

of its array, namely that part of the array that contains sums of all corresponding elements originally held on all the nodes, to its paired node, and receives $$\frac{1}{2^L}$$

of that node's array. This is done in such a way that each of the two paired nodes then has $$\frac{1}{2^{L-1}}$$

of the overall sums.

In the second substep, for each array, each node sends $$\frac{1}{2^{L-1}}$$

of its array, namely that part of the array that contains sums of all corresponding elements originally held on all the nodes, to its paired node, and receives $$\frac{1}{2^{L-1}}$$

of that node's array. This is done in such a way that each of the two paired nodes then has $$\frac{1}{2^{L-2}}$$

of the overall sums.

Subsequent substeps proceed in like manner, so that on each substep, for each array, each node sends and receives $$\frac{1}{2^k}$$

of that array. On the last substep, for each array, each node sends and receives ½ of that array.

The final result of the second additional major step is that for each of the three arrays, for every position in that array, every node holds the sum of all the corresponding elements of that array as originally held on all the nodes.

The computations on lines 42, 43, 69, and 70 of Pseudocode II make use of a function bitReverse that accepts two nonnegative integers x and k and returns an integer constructed from the binary representation of x by reversing the order of the k lower-order bits of x and setting equal to 0 all bits more significant than the k low-order bits. That function is defined as follows:
1: function bitReverse (x, k)
2: return $$\sum_{j=0}^{k-1} \left( \left\lfloor \frac{x}{2^{(k-1)-j}} \right\rfloor \bmod 2 \right) 2^j$$

3: end function
Approximate Counters
As indicated above, Pseudocode II describes a distributed LDA Gibbs sampler that uses conventional counters. All of the communications between nodes to aggregate counter values require bandwidth for 32-bit counter values. In Pseudocodes III, IV, and V, the described LDA Gibbs algorithms use approximate counters that generally require eight or fewer bits instead of 32 bits. This allows the nodes to communicate counter values more efficiently, which speeds up algorithm processing.

At step 206 of flowchart 200, the first computing device running an uncollapsed Gibbs sampler over a Dirichlet distribution of the plurality of words in the set of documents to produce sampler result data comprises receiving, from a second computing device, a first approximate counter value that corresponds to a particular counter. For example, sampling service 124A, running an uncollapsed Gibbs sampler as described in Pseudocode III, receives one or more approximate counter values from a second node (sampling service 124N of server device 120N) in distributed system 120, i.e., the node that is designated by otherNodeNumber (see lines 57-62 of Pseudocode III).

According to embodiments, sampling service 124A represents counts in an uncollapsed Gibbs sampler (e.g., the counts represented in topicCounts, topicAssignments, and documentCounts) using approximate counters. In one embodiment implementing an uncollapsed Gibbs sampler that makes use of a GPU, such as GPU 122, the topicCounts, topicAssignments, and documentCounts arrays are kept in the memory of GPU 122, along with other arrays, and the total amount of data (all words in all documents) that can be processed is limited by the amount of memory provided by GPU 122. Reducing the total size in bits of the topicCounts, topicAssignments, and documentCounts arrays (i.e., by replacing 32-bit conventional counters with 8-bit or smaller approximate counters) allows more data to be processed by GPU 122.

Distributed LDA Gibbs with Binary Morris Approximate Counters

In one embodiment, sampling service 124A represents the counts in the three arrays of counters with binary Morris approximate counters, in which each counter uses 8 bits rather than 32 bits. In the following pseudocode, referred to herein as "Pseudocode III", the three lines of code in the "DrawZ" procedure that increment counters (that is, Pseudocode II, lines 30-32) are replaced by other code that increments the approximate counters, producing the following of the "DrawZ" procedure:

```
 1: //Pseudocode III: Distributed algorithm for drawing new z, then summing counters, using
 2:     binary Morris approximate counters
 3: procedure DrawZ (K, M, V, N[M], θ[M, K], φ[V, K], w[M][N]; output z[M, N])
 4:     local array a[M][N][K], p[M][N][K]
 5:     for all 0 ≤ m < M do
 6:         for all 0 ≤ i < N[m] do
 7:             //Compute θ-φ products
 8:             for all 0 ≤ k < K do
 9:                 a[m][i][k] ← θ[m, k] × φ[w[m][i], k]
10:             end for
11:             //Compute partial sums of the products
12:             begin
13:                 let sum ← 0.0
14:                 for k sequentially from 0 through K − 1 do
15:                     sum ← sum + a[m][i][k]
16:                     p[m][i][k] ← sum
17:                 end for
18:             end
19:             //Search the table of partial sums
20:             begin
21:                 let u ← random value chosen uniformly from the real interval [0.0, 1.0)
22:                 let stop ← sum × u
23:                 let j ← 0
24:                 //Linear search of table p[m][i]
25:                 while j < K − 1 and stop ≥ p[m][i][j] do
26:                     j ← j + 1
27:                 end while
28:                 z[m, i] ← j
29:             end
30:             //Increment three counters
31:             repeat
32:                 let n ← topicCounts[w[m][i]][j]
33:                 let C ← collection of n uniformly pseudorandomly chosen bits
34:             until (some bit in C is nonzero or else
                        compareAndSwap(topicCounts[w[m][i]][j], n, n + 1) succeeds)
35:             repeat
36:                 let n ← topicAssignments[j]
37:                 let C ← collection of n uniformly pseudorandomly chosen bits
38:             until (some bit in C is nonzero or else compareAndSwap(topicAssignments[j] , n,
                        n + 1) succeeds)
39:             repeat
40:                 let n ← documentCounts[m][j]
41:                 let C ← collection of n uniformly pseudorandomly chosen bits
42:             until (some bit in C is nonzero or else compareAndSwap(documentCounts[m][j],
                        n, n + 1) succeeds)
43:         end for
44:     end for
45:     //We assume that NumberOfNodes is a power of 2
46:     let L ← $\log_2$ numberOfNodes
47:     //The nodes exchange data according to a standard hypercube pattern, computing sums.
48:     for k sequentially from 1 through L do
49:         let otherNodeNumber ← myNodeNumber ⊕ $2^{k-1}$
```

```
50:         //We assume that K is a multiple of NumberOfNodes
51:         let B ← (K/numberOfNodes) << (L − k)
52:         let myBlock ← B · bitReverse(myNodeNumber & ((1 << k) − 1), k)
53:         let otherBlock ← B · bitReverse(otherNodeNumber & ((1 << k) − 1), k)
54:         local array topicCountsRemote[V, B]
55:         local array topicAssignmentsRemote[B]
56:         local array documentCountsRemote[M, B]
57:         send topicCounts[:, otherBlock : otherBlock + B − 1] to node otherNodeNumber
58:             and receive data from that node into topicCountsRemote
59:         send topicAssignments[otherBlock : otherBlock + B − 1] to node otherNodeNumber
60:             and receive data from that node into topicAssignmentsRemote
61:         send documentCounts[:, otherBlock : otherBlock + B − 1] to node otherNodeNumber
62:             and receive data from that node into documentCountsRemote
63:         for all 0 ≤ j < B do
64:             let y ← myBlock + j
65:             for all 0 ≤ v < V do
66:                 let p ← max(topicCounts[v, y], topicCountsRemote[v, j])
67:                 let q ← min(topicCounts[v, y], topicCountsRemote[v, j])
68:                 if allZeroRandomBits(p − q) and also¬ allZeroRandomBits(q) then
69:                     topicCounts[v, y] ← p + 1
70:                 else
71:                     topicCounts[v, y] ← p
72:                 end if
73:             end for
74:             begin
75:                 let p ← max(topicAssignments[y], topicAssignmentsRemote[j])
76:                 let q ← min(topicAssignments[y], topicAssignmentsRemote[j])
77:                 if allZeroRandomBits(p − q) and also¬ allZeroRandomBits(q) then
78:                     topicAssignments[y] ← p + 1
79:                 else
80:                     topicAssignments[y] ← p
81:                 end if
82:             end
83:             for all 0 ≤ m < M do
84:                 let p ← max(documentCounts[m, y], documentCountsRemote[m, j])
85:                 let q ← min(documentCounts[m, y], documentCountsRemote[m, j])
86:                 if allZeroRandomBits(p − q) and also¬ allZeroRandomBits(q) then
87:                     documentCounts[m, y] ← p + 1
88:                 else
89:                     documentCounts[m, y] ← p
90:                 end if
91:             end for
92:         end for
93:     end for
94:     //The nodes exchange data according to a standard hypercube pattern, broadcasting the sums.
95:     for k sequentially downward from L through 1 do
96:         let otherNodeNumber ← myNodeNumber ⊕ $2^{k-1}$
97:         //We assume that K is a multiple of NumberOfNodes
98:         let B ← (K/numberOfNodes) << (L − k)
99:         let myBlock ← B · bitReverse(myNodeNumber & ((1 << k) − 1), k)
100:        let otherBlock ← B · bitReverse(otherNodeNumber & ((1 << k) − 1), k)
101:        send topicCounts[:, myBlock : myBlock + B − 1] to node otherNodeNumber
102:            and receive data from that node into topicCounts[:, otherBlock: otherBlock + B − 1]
103:        send topicAssignments[myBlock : myBlock + B − 1] to node otherNodeNumber
104:            and receive data from that node into topicAssignments[otherBlock : otherBlock + B − 1]
105:        send documentCounts[:, myBlock : myBlock + B − 1] to node otherNodeNumber
106:            and receive data from that node into documentCounts[:, otherBlock : otherBlock + B − 1]
107:    end for
108: end procedure
```

Pseudocode III makes use of an auxiliary procedure allZeroRandomBits that accepts a nonnegative integer n and returns true with probability $2^{-n}$ and false with probability $1-2^{-n}$.

```
1: function allZeroRandomBits (n)
2:     generate n uniform random bits (each is 1 with probability ½ and
           0 with probability ½)
3:     if all the generated bits are 0 then
4:         return true
5:     else
6:         return false
7:     end if
8: end function
```

Adding Binary Morris Approximate Counters

At step 208 of flowchart 200, the first computing device running an uncollapsed Gibbs sampler over a Dirichlet distribution of the plurality of words in the set of documents to produce sampler result data further comprises adding the first approximate counter value to a second approximate counter value that also corresponds to the particular counter to produce an aggregate approximate counter value. For example, Pseudocode III causes two binary Morris approximate counters to be added together in the course of computations for the distributed Gibbs sampler. According to embodiments, adding two such approximate counters has the property that the expected value of the result is equal to the sum of the expected values of the inputs. Adding binary Morris approximate counters occurs in three places in Pseudocode III (i.e., line 56 of Pseudocode II is replaced by lines 66-72 in Pseudocode III, line 58 of Pseudocode II is replaced by lines 74-82 Pseudocode III, line 58 of Pseudocode II is replaced by lines 84-90 in Pseudocode III).

To illustrate addition of binary Morris approximate counters, the behavior of lines 66-72 of Pseudocode III is described. (The behavior of the other two uses in Pseudocode III is similar). Let a be the integer value of topicCounts[w, y] before execution of lines 66-72 of Pseudocode III, and let b be the integer value of topicCountsRemote[w,j] before execution of lines 66-72 of Pseudocode III; then the expected value of topicCounts[w, y] regarded as an approximate counter is $2^a-1$, and the expected value of topicCountsRemote[w,j] regarded as an approximate counter is $2^b-1$. Then p=max(a, b) and q=min(a, b).

The code on lines 68-72 of Pseudocode III assigns the value p+1 to the variable topicCounts[w, y] only if allZeroRandomBits(p−q) is true (which occurs with probability $$\frac{1}{2^{p-q}})$$

and allZeroRandomBits(q) is false (which occurs with probability $$\frac{1}{2^{p-q}}\left(1-\frac{1}{2^q}\right) = \frac{2^q-1}{2^p}.$$

thus the probability that both conditions are true is $$\frac{1}{2^q});$$

In this case the expected value of the variable topicCounts [w, y] regarded as an approximate counter will be $2^{p+1}-1$. Otherwise it assigns the value p to the variable topicCounts [w, y], and its expected value regarded as an approximate counter will be $2^p-1$. Multiplying these two expected values by their respective probabilities of occurring and then adding the results, the overall expected value for the variable topicCounts[w, y] is:

$$\frac{2^q-1}{2^p}(2^{p+1}-1)+\left(1-\frac{2^q-1}{2^p}\right)(2^p-1) = (2^p-1)+(2^q-1)$$

which is exactly the sum of the two original expected values.

According to embodiments, when summing the binary Morris approximate counters, conversion of the approximate counter values to expected values is not required. Of course, expected values are determined from binary Morris approximate counters in order to identify values for θ and φ in the process of the LDA Gibbs algorithm, as described in further detail below. Adding two binary Morris approximate counter values to produce a third binary Morris approximate counter value without any need for conversion to expected values further streamlines the memory requirements of both the LDA Gibbs algorithm running on individual nodes of distributed system 120.

In another embodiment, the "for all" loop (starting at Pseudocode III, line 6) executes its iterations sequentially, and lines 39-42 of Pseudocode III that increment the counter documentCounts[m][j] is replaced with the following:

```
1: begin
2:     let n ← documentCounts[m][j]
3:     let C ← collection of n uniformly pseudorandomly chosen bits
4:     if every bit in C is zero then
5:         documentCounts[m][j] ← n+1
6:     end if
7: end
```

Using the Aggregated Counter Values

In the context of Pseudocode III, sampling service 124A performs additional computations (such as identifying values for θ and φ) for the Gibbs sampler, which include actions described in the following pseudocode that reads the binary Morris approximate counters:

each read access topicCounts[a][j] is replaced by the expression ((1<<topicCounts[a][j])−1);
each read access topicAssignments[j] is replaced by the expression ((1<<topicAssignments[j])−1); and
each read access documentCounts[m][j] is replaced by the expression ((1<<documentCounts[m][j])−1).

In the above expressions, '<<' is the arithmetic left-shift operator (thus ((1<<n)−1) computes the mathematical quantity $2^n-1$). Code that initializes the counters to zero remains unchanged (except for the fact that the elements being cleared are 8 bits wide rather than 32 bits wide).

In this manner each element of each of the three arrays of counters is treated as a binary Morris approximate counter: incrementations are performed only probabilistically, and the integer value in an approximate counter is approximately the base-2 logarithm of the number of prior incrementation attempts (more precisely, if the approximate counter holds the integer value n, then $2^n-1$ is a statistically reasonable estimate of the number of prior incrementation attempts).

At step 210 of flowchart 200, the aggregate approximate counter value is used as the value of the particular counter. For example, at lines 66-72 of Pseudocode III, the approximate counter values for topicCount, i.e., from server devices 120A and 120N, are summed as described above and the resulting topicCount value is stored in topicCounts[w, y]. The values stored in topicCounts are used to draw (or, in the case of a Greedy Gibbs sampler, calculate) values for θ and φ. For further illustration, application Ser. No. 14/599,272 describes identifying values for θ and φ based on counts, including counts of the type stored in topicCounts. In order to utilize the aggregated counter values to identify θ and φ, sampling service 124A determines an expected value, that is calculated based on each aggregated approximate count value, to use in the LDA Gibbs sampler.

Distributed LDA Gibbs with General Morris Approximate Counters

In another embodiment, the three arrays of counters (i.e., topicCounts, topicAssignments, and documentCounts) again contain counters represented as eight or fewer bits rather than 32 bits. Again the three lines of code in the "DrawZ" procedure that increment counters from Pseudocode II (lines 30-32) are replaced by other code, and the three lines of code that add counters from Pseudocode II (lines 56, 58, and 60) are also replaced by other code, producing version 4 of the "DrawZ" procedure (referred to herein as Pseudocode IV). In this pseudocode, it is assumed that q is a preselected floating-point constant such that 1<q<2.

In one embodiment, q=1.1. In the context of a Gibbs sampler, the upper bound for the general Morris counter that is produced when q=1.1 is a more reasonable number, in light of the counts that are reasonably expected for the Gibbs sampler, than the upper bound for the binary Morris counter. As such, using 1.1 as the value for q results in at least somewhat more accurate counts for the Gibbs sampler than using the value 2 for q (as in the binary Morris counter).

```
1:   //Pseudocode IV: Distributed algorithm for drawing z, then summing counters,
2:        using general Morris approximate counters
3:   procedure DrawZ(K, M, V, N[M], θ[M,K], φ[V,K], w[M][N]; output z[M,N])
4:       local array a[M][N][K], p[M][N][K]
5:       for all 0 ≤ m < M do
6:           for all 0 ≤ i < N[m] do
7:               // Compute θ-φ products
8:               for all 0 ≤ k < K do
9:                   a[m][i][k] ← θ[m, k] × φ[w[m][i], k]
10:              end for
11:              // Compute partial sums of the products
12:              begin
13:                  let sum ← 0.0
14:                  for k sequentially from 0 through K - 1 do
15:                      sum ← sum + a[m][i][k]
16:                      p[m][i][k] ← sum
17:                  end for
18:              end
19:              // Search the table of partial sums
20:              begin
21:                  let u ← random value chosen uniformly from the real interval [0.0, 1.0)
22:                  let stop ← sum × u
23:                  let j ← 0
24:                  // Linear search of table p[m][i]
25:                  while j < K - 1 and stop ≥ p[m][i][j] do
26:                      j ← j +1
27:                  end while
28:                  z[m, i] ← j
29:              end
30:              // Increment three counters
31:              repeat
32:                  let n ← topicCounts[w[m][i]][j]
33:                  let u ← floating-point value chosen uniformly pseudorandomly from the
                         interval [0, 1)
34:              until (u ≥ q$^{-n}$ or else compareAndSwap(topicCounts[w[m][i]][j], n, n + 1) succeeds)
35:              repeat
36:                  let n ← topicAssignments[j]
37:                  let u ← floating-point value chosen uniformly pseudorandomly from the
                         interval [0, 1)
38:              until (u ≥ q$^{-n}$ or else compareAndSwap(topicAssignments[j], n, n + 1) succeeds)
39:              repeat
40:                  let n ← documentCounts[m][j]
41:                  let u ← floating-point value chosen uniformly pseudorandomly from the
                         interval [0, 1)
42:              until (u ≥ q$^{-n}$ or else compareAndSwap(documentCounts[m][j], n, n + 1) succeeds)
43:          end for
44:      end for
45:      //We assume that NumberOfNodes is a power of 2
46:      let L ← log$_2$ numberOfNodes
47:      //The nodes exchange data according to a standard hypercube pattern, computing sums.
48:      for k sequentially from 1 through L do
49:          let otherNodeNumber ← myNodeNumber ⊕ 2$^{k-1}$
50:          //We assume that K is a multiple of NumberOfNodes
51:          let B ← (K/numberOfNodes) << (L - k)
52:          let myBlock ← B · bitReverse(myNodeNumber & ((1 << k) - 1), k)
53:          let otherBlock ← B · bitReverse(otherNodeNumber & ((1 << k) - 1), k)
54:          local array topicCountsRemote[V, B]
55:          local array topicAssignmentsRemote[B]
56:          local array documentCountsRemote[M, B]
57:          send topicCounts[:, otherBlock : otherBlock + B - 1] to node otherNodeNumber
58:              and receive data from that node into topicCountsRemote
59:          send topicAssignments[otherBlock : otherBlock + B - 1] to node otherNodeNumber
60:              and receive data from that node into topicAssignmentsRemote
61:          send documentCounts[:, otherBlock : otherBlock + B - 1] to node otherNodeNumber
62:              and receive data from that node into documentCountsRemote
63:          for all 0 ≤ j < B do
64:              let y ← myBlock + j
65:              for all 0 ≤ v < V do
66:                  let a ← topicCounts[v, y]
67:                  let b ← topicCountsRemote[v, j]
```

-continued

```
68:            let r ← q^a + q^b
69:            let s ← (r - 2)/(q - 1)
70:            let p ← ⌊log_q (r - 1)⌋
71:            let v ← (q^p - 1)/(q - 1)
72:            if random( ) < q^{-p}(s - v) then
73:                topicCounts[v, y] ← p + 1
74:            else
75:                topicCounts[v, y] ← p
76:            end if
77:          end for
78:          begin
79:            let a ← topicAssignments[y]
80:            let b ← topicAssignmentsRemote[j]
81:            let r ← q^a + q^b
82:            let s ← (r - 2)/(q - 1)
83:            let p ← ⌊log_q (r - 1)⌋
84:            let v ← (q^p - 1)/(q - 1)
85:            if random( ) < q^{-p}(s - v) then
86:                topicAssignments[y] ← p + 1
87:            else
88:                topicAssignments[y] ← p
89:            end if
90:          end
91:          for all 0 ≤ m < M do
92:            let a ← documentCounts[m, y]
93:            let b ← documentCountsRemote[m, j]
94:            let r ← q^a + q^b
95:            let s ← (r - 2)/(q - 1)
96:            let p ← ⌊log_q (r - 1)⌋
97:            let v ← (q^p - 1)/(q - 1)
98:            if random( ) < q^{-p}(s - v) then
99:                documentCounts[m, y] ← p + 1
100:           else
101:               documentCounts[m, y] ← p
102:           end if
103:         end for
104:       end for
105:     end for
106:     //The nodes exchange data according to a standard hypercube pattern, broadcasting the sums.
107:     for k sequentially downward from L through 1 do
108:       let otherNodeNumber ← myNodeNumber ⊕ 2^{k-1}
109:       //We assume that K is a multiple of NumberOfNodes
110:       let B ← (K/numberOfNodes) << (L - k)
111:       let myBlock ← B · bitReverse(myNodeNumber & ((1 << k) - 1), k)
112:       let otherBlock ← B · bitReverse(otherNodeNumber & ((1 << k) - 1), k)
113:       send topicCounts[:, myBlock : myBlock + B - 1] to node otherNodeNumber
114:          and receive data from that node into topicCounts[:, otherBlock : otherBlock + B - 1]
115:       send topicAssignments[myBlock : myBlock + B - 1] to node otherNodeNumber
116:          and receive data from that node into topicAssignments[otherBlock : otherBlock + B - 1]
117:       send documentCounts[:, myBlock : myBlock + B - 1] to node otherNodeNumber
118:          and receive data from that node into documentCounts[:, otherBlock : otherBlock + B - 1]
119:     end for
120:   end procedure
```

Finally, in other parts of the algorithm, partly represented in Pseudocode IV, that read the counters:

each read access topicCounts[a][j] is replaced by the expression ((pow(q, topicCounts[a][j])−1)/(q−1));

each read access topicAssignments[j] is replaced by the expression ((pow(q, topicAssignments[j])−1)/(q−1)); and each read access documentCounts[m][j] is replaced by the expression ((pow(q, documentCounts[m][j])−1)/(q−1)).

In the above expressions, pow(x, y) is function that raises x to the power y. Thus, if the integer value of an approximate counter is n, the expression ((pow(q, n)−1)/(q−1)) computes the mathematical quantity $$\frac{q^n - 1}{q - 1}.$$

Code that initializes the counters to zero remains unchanged (except for the fact that the elements being cleared are 8 bits wide rather than 32 bits wide).

In this manner, each element of each of the three arrays of counters is treated as an approximate counter of the general kind as described by Morris: incrementations are performed only probabilistically, and the integer value in an approximate counter is approximately the base-q logarithm of the number of prior incrementation attempts (more precisely, if the approximate counter holds the integer value n, then $$\frac{q^n - 1}{q - 1}$$

is a statistically reasonable estimate of the number of prior incrementation attempts).

Pseudocode IV describes adding two such approximate counters. Adding two general Morris approximate counters, according to embodiments, has the property that the expected value of the result is equal to the sum of the expected values of the inputs. This addition is used in three places in Pseudocode IV: line 56 of Version 2 is replaced by lines 66-76 in Version 4, line 58 of Version 2 is replaced by lines 78-90 in Version 4, line 58 of Version 2 is replaced by lines 92-102 in Version 4.

As an example, the behavior of lines 66-76 of Pseudocode IV is described. (The behavior of the other two uses of the method is similar). Let a be the integer value of topicCounts[w, y] before execution of lines 66-76, and let b be the integer value of topicCountsRemote[w,j] before execution of lines 66-76; then the expected value of topicCounts[w, y] regarded as an approximate counter is $$\frac{q^a - 1}{q - 1},$$

and the expected value of topicCountsRemote[w,j] regarded as an approximate counter is $$\frac{q^b - 1}{q - 1}.$$

Then $r = q^a + q^b$, $$s = \frac{r - 2}{q - 1},$$

$p = \lfloor \log_q(r-1) \rfloor$, and $$v = \frac{q^p - 1}{q - 1}.$$

The task of lines 66-76 of Pseudocode IV is to identify an aggregated general Morris approximate count value whose expected value is the sum of the expected values of the two general Morris approximate counters to be added together (topicCounts[w, y] and topicCountsRemote[w,j]). However, in the majority of the cases and because approximate counter values are integers, there is no general Morris approximate counter value that exactly represents the sum of the expected values of the any two given general Morris approximate counters. As such, embodiments choose between the two general Morris approximate counter value that, respectively represent:

the expected value just above the sum of the expected values of the two general Morris approximate counters to be added together; and the expected value just below the sum of the expected values of the two general Morris approximate counters to be added together.

Thus, in Pseudocode IV, s represents the sum of the expected values of the two general Morris approximate counters to be added together. The variable p represents an integer counter value (for a general Morris approximate counter) whose expected value is below s, where p+1 represents an integer counter value (for a general Morris approximate counter) whose expected value is above s. Also, v is the expected value given a general Morris approximate counter with the value of p.

This choice, between the aggregated expected value just below or just above the sum of the expected values of the approximate counters to be added, is made according to probabilities such that the final statistical expected value of the aggregated approximate counter is equal to the sum of the expected values of the counters to be added together. Specifically, the aggregated approximate counter value that yields the expected value just above the sum of the expected values of the counters to be added together is chosen when random( )<$q^{-p}$(s−v) is true, i.e., when a random number between 0 and 1 is less than a scaling factor $q^{-p}$ multiplied by the difference between (a) the sum of the expected values of the two general Morris approximate counters to be added together and (b) the expected value of p, which is the expected value producible by a general Morris counter that is just below the sum of the expected values of the two general Morris approximate counters to be added together.

The code on lines 72-76 assigns the value p+1 to the variable topicCounts[w, y] only if random( )<$q^{-p}$(s−v) is true; the procedure random returns a real value chosen uniformly pseudorandomly from the range [0.0, 1.0), so the tested condition should be true with probability $q^{-p}$(s−v). In this case the expected value of the variable topicCounts[w, y] regarded as an approximate counter will be $$\frac{q^{p+1}-1}{q-1}.$$

Otherwise it assigns the value p to the variable topicCounts [w, y], and its expected value regarded as an approximate counter will be $$\frac{q^p-1}{q-1}.$$

Multiplying these two expected values by their respective probabilities of occurring and then adding the results, the overall expected value for the variable topicCounts[w, y] is exactly the sum of the two original expected values.

According to embodiments, the values r, s, p, and v and the test random( )<$q^{-p}$(s−v) are calculated only approximately. As a non-limiting example, these values and/or test are calculated approximately by using floating-point arithmetic rather than exact real arithmetic.

In an embodiment, the "for all" loop starting at Pseudocode IV, line 6 executes its iterations sequentially, and lines 39-42 of Pseudocode IV, that increment the counter documentCounts[m][j], are replaced with the following code:

```
1: begin
2:     let n ← documentCounts[m][j]
3:     let u ← floating-point value chosen uniformly pseudorandomly
           from the interval [0, 1)
4:     if u < q⁻ⁿ then
5:         documentCounts[m][j] ← n+1
6:     end if
7: end
```

Distributed LDA Gibbs with Csűrös Approximate Counters

In an embodiment, the three arrays of counters (i.e., topicCounts, topicAssignments, and documentCounts) again contain counters represented as eight or fewer bits rather than 32 bits, and again the three lines of code in the "DrawZ" procedure (of Pseudocode II) that increment counters are replaced by other code, and the three lines of pseudocode in Pseudocode II in the "DrawZ" procedure that add counters (that is, lines 56, 58, and 60) are also replaced by other code, producing version 5 of the "DrawZ" procedure (referred to herein as "Pseudocode V"). In Pseudocode V, '<<' is the arithmetic left-shift operator such that x<<n computes the mathematical value $x2^n$. Further, '>>' is the arithmetic right-shift operator such that x>>n computes the mathematical value $$\left\lfloor \frac{x}{2^n} \right\rfloor,$$

and '&' is the bitwise AND operator on two binary integers. In Pseudocode V, it is assumed that s is a preselected nonnegative integer (which is different than the use of s in Pseudocode IV). In one embodiment, s=4; in another embodiment, s=5.

In Pseudocode V, it is also assumed the use of a machine word that is B bits wide for representing estimated values (in contrast to the possibly smaller words that may be used for counter representation values), and a function countLeadingZeros that counts the number of leading zeros in a B-bit word. In one embodiment of this invention, B=32; in another embodiment of this invention, B=64.

```
1:  //Pseudocode V: Distributed algorithm for drawing z, then summing counters,
2:                  using Csűrös approximate counters
3:  procedure DrawZ(K, M, V, N[M], θ[M, K], φ[V, K], w[M][N]; output z[M, N])
4:      local array a[M][N][K], p[M][N][K]
5:      for all 0 ≤ m < M do
6:          for all 0 ≤ i < N[m] do
7:              // Compute θ-φ products
8:              for all 0 ≤ k < K do
9:                  a[m][i][k] ← θ[m, k] × φ[w[m][i], k]
10:             end for
11:             // Compute partial sums of the products
12:             begin
13:                 let sum ← 0.0
14:                 for k sequentially from 0 through K − 1 do
15:                     sum ← sum + a[m][i][k]
16:                     p[m][i][k] ← sum
17:                 end for
18:             end
19:             // Search the table of partial sums
20:             begin
21:                 let u ← random value chosen uniformly from the real interval [0.0, 1.0)
22:                 let stop ← sum × u
23:                 let j ← 0
24:                 // Linear search of table p[m][i]
25:                 while j < K − 1 and stop ≥ p[m][i][j] do
26:                     j ← j + 1
27:                 end while
28:                 z[m, i] ← j
29:             end
30:             // Increment three counters
31:             repeat
```

```
32:            let n ← topicCounts[w[m][i]][j] >> s
33:            let C ← collection of n uniformly pseudorandomly chosen bits
34:          until (some bit in C is nonzero or else compareAndSwap(topicCounts[w[m][i]][j],
                            n, n + 1) succeeds)
35:          repeat
36:            let n ← topicAssignments[j] >> s
37:            let C ← collection of n uniformly pseudorandomly chosen bits
38:          until (some bit in C is nonzero or else compareAndSwap(topicAssignments[j], n,
                            n + 1) succeeds)
39:          repeat
40:            let n ← documentCounts[m][j] >> s
41:            let C ← collection of n uniformly pseudorandomly chosen bits
42:          until (some bit in C is nonzero or else compareAndSwap(documentCounts[m][j],
                            n, n + 1) succeeds)
43:       end for
44:    end for
45:    //We assume that NumberOfNodes is a power of 2
46:    let L ← log2 numberOfNodes
47:    //The nodes exchange data according to a standard hypercube pattern, computing sums.
48:    for k sequentially from 1 through L do
49:       let otherNodeNumber ← myNodeNumber ⊕ 2^(k−1)
50:       //We assume that K is a multiple of NumberOfNodes
51:       let B ← (K/numberOfNodes) << (L − k)
52:       let myBlock ← B · bitReverse(myNodeNumber & ((1 << k) − 1), k)
53:       let otherBlock ← B · bitReverse(otherNodeNumber & ((1 << k) − 1), k)
54:       local array topicCountsRemote[V, B]
55:       local array topicAssignmentsRemote[B]
56:       local array documentCountsRemote[M, B]
57:       send topicCounts[:, otherBlock : otherBlock + B − 1] to node otherNodeNumber
58:          and receive data from that node into topicCountsRemote
59:       send topicAssignments[otherBlock : otherBlock + B − 1] to node otherNodeNumber
60:          and receive data from that node into topicAssignmentsRemote
61:       send documentCounts[:, otherBlock : otherBlock + B − 1] to node otherNodeNumber
62:          and receive data from that node into documentCountsRemote
63:       for all 0 ≤ j < B do
64:          let y ← myBlock + j
65:          for all 0 ≤ v < V do
66:             let a ← topicCounts[v, y]
67:             let b ← topicCountsRemote[v, j]
68:             let g ← ((2^s + (a & (2^s − 1))) << (a >> s)) + ((2^s + (b & (2^s − 1))) << (b >> s))
69:             let h ← g − 2^s
70:             let d ← (B − (s + 1)) − countLeadingZeros(h)
71:             let p ← (d << s) + (h >> d) − 2^s
72:             if randomBits(d) < (h & ((1 << d) − 1)) then
73:                topicCounts[v, y] ← p + 1
74:             else
75:                topicCounts[v, y] ← p
76:             end if
77:          end for
78:          begin
79:             let a ← topicAssignments[y]
80:             let b ← topicAssignmentsRemote[j]
81:             let g ← ((2^s + (a & (2^s − 1))) << (a >> s)) + ((2^s + (b & (2^s − 1))) << (b >> s))
82:             let h ← g − 2^s
83:             let d ← (B − (s + 1)) − countLeadingZeros(h)
84:             let p ← (d << s) + (h >> d) − 2^s
85:             if randomBits(d) < (h & ((1 << d) − 1)) then
86:                topicAssignments[y] ← p + 1
87:             else
88:                topicAssignments[y] ← p
89:             end if
90:          end
91:          for all 0 ≤ m < M do
92:             let a ← documentCounts[m, y]
93:             let b ← documentCountsRemote[m, j]
94:             let g ← ((2^s + (a & (2^s − 1))) << (a >> s)) + ((2^s + (b & (2^s − 1))) << (b >> s))
95:             let h ← g − 2^s
96:             let d ← (B − (s + 1)) − countLeadingZeros(h)
97:             let p ← (d << s) + (h >> d) − 2^s
98:             if randomBits(d) < (h & ((1 << d) − 1)) then
99:                documentCounts[m, y] ← p + 1
100:            else
101:               documentCounts[m, y] ← p
102:            end if
103:         for
104:      end for
105:   end for
106:   //The nodes exchange data according to a standard hypercube pattern, broadcasting the
                sums.
```

```
107:        for k sequentially downward from L through 1 do
108:            let otherNodeNumber ← myNodeNumber ⊕ 2^(k-1)
109:            //We assume that K is a multiple of NumberOfNodes
110:            let B ← (K/numberOfNodes) << (L - k)
111:            let myBlock ← B · bitReverse(myNodeNumber & ((1 << k) - 1), k)
112:            let otherBlock ← B · bitReverse(otherNodeNumber & ((1 << k) - 1), k)
113:            send topicCounts[:, myBlock : myBlock + B - 1] to node otherNodeNumber
114:                and receive data from that node into topicCounts[:, otherBlock : otherBlock + B -
                        1]
115:            send topicAssignments[myBlock : myBlock + B - 1] to node otherNodeNumber
116:                and receive data from that node into topicAssignments[otherBlock : otherBlock +
                        B - 1]
117:            send documentCounts[:, myBlock : myBlock + B - 1] to node otherNodeNumber
118:                and receive data from that node into documentCounts[:, otherBlock : otherBlock
                        + B - 1]
119:        end for
120:    end procedure
```

Finally, in other parts of the algorithm, partly represented in Pseudocode V, that read the counters, each read access that fetches an integer value n from an approximate counter then uses the expression $((2^s+n \ \& \ (2^s-1)) << (n>>s))-2^s$ to compute an expected value, or a statistical approximation of the number of prior incrementation attempts. Code that initializes the counters to zero remains unchanged (except for the fact that the elements being cleared are 8 bits wide rather than 32 bits wide).

In this manner, each element of each of the three arrays of counters is treated as an approximate counter of the general kind as described by Csűrös: incrementations are performed only probabilistically, and the integer value in an approximate counter is a kind of specialized floating-point representation from which an estimate of the number of prior incrementation attempts can be computed. More precisely, if the Csűrös approximate counter holds the integer value n, then $(2^s+(n \bmod 2^s))2^{\lfloor n/2^s \rfloor}-2^s$ is a statistically reasonable estimate of the number of prior incrementation attempts.

Pseudocode V describes adding two such Csűrös approximate counters. Adding two Csűrös approximate counters, according to embodiments, has the property that the expected value of the result is equal to the sum of the expected values of the inputs. The method is used in three places in Pseudocode V: line 56 of Pseudocode II is replaced by lines 66-76 in Pseudocode V, line 58 of Pseudocode II is replaced by lines 78-90 in Pseudocode V, line 58 of Pseudocode II is replaced by lines 92-102 in Pseudocode V.

In Pseudocode V, let a be the integer value of topicCounts [w, y] before execution of lines 66-76, and let b be the integer value of topicCountsRemote[w,j] before execution of lines 66-76; then the expected value of topicCounts[w, y] regarded as an approximate counter is $((2^s+(a \ \& \ (2^s-1))) << (a>>s))-2^s$, and the expected value of topicCountsRemote [w,j] regarded as an approximate counter is $((2^s+(b \ \& \ (2^s-1))) << (b>>s))-2^s$. Then:

$g=((2^s+(a \ \& \ (2^s-1))) << (a>>s))+((2^s+(b \ \& \ (2^s-1))) << (b>>s));$ $h=g-2^s, d=(B-(s+1))-countLeadingZeros(h);$ and $p=(d<<s)+(h>>d)-2^s.$ To illustrate adding Csűrös approximate counters, the behavior of lines 66-76 of Pseudocode V is described. The task of lines 66-76 of Pseudocode V is to identify an aggregated Csűrös approximate count value whose expected value is the sum of the expected values of the two Csűrös approximate counters to be added together, i.e., topicCounts [w, y] and topicCountsRemote[w,j]. The sum of the expected values of two approximate counter values to be added together is referred to herein as the "aggregate expected value".

As with general Morris approximate counters, in the majority of the cases, there is no Csűrös approximate counter value that exactly represents the sum of the expected values of the any two given Csűrös approximate counters. As such, embodiments choose between the two Csűrös approximate counter values that respectively represent:

the expected value just above the aggregate expected value (represented by the approximate counter value p+1); and the expected value just below the aggregate expected value (represented by the approximate counter value p).

Thus, in Pseudocode V, g represents the aggregate expected value (e.g., for topicCounts[w, y] and topicCountsRemote[w,j]) except without two $2^s$ subtracted therefrom. The variable p represents an integer value (for a Csűrös approximate counter) whose expected value is below the required aggregate expected value, where p+1 represents an integer value (for a Csűrös approximate counter) whose expected value is above the required aggregate expected value. Also, h represents the aggregate expected value with a $2^s$ added thereto, since this quantity is used in calculating a Csűrös approximate counter value from which the aggregated expected value may be derived.

The variable d represents an appropriate shift distance for normalizing the expected value. For example, in the calculation of p, the term (h>>d) shifts h to the right by d bits (which normalizes h, preparing the value in h to be the significand in the floating-point-style Csűrös approximate counter value of p) and then $2^s$ is subtracted to get rid of the leading 1-bit. Also, the term (d<<s) left shifts d by s bits. Pseudocode V adds the left-shifted value of d to the normalized value of h, which causes the value resulting from (d<<s) to be the exponent in p.

The code on lines 72-76 of Pseudocode V assigns the value p+1 to the variable topicCounts[w, y] only if randomBits(d)<(h & ((1<<d)-1)) is true; the procedure randomBits (d) returns an integer value chosen uniformly pseudo-randomly from the $2^d$ integer values in the range [0, $2^d$), so the tested condition should be true with probability $2^{-d}$(h & ((1<<d)-1)). To illustrate the functionality of the tested condition, the term ((1<<d)-1) creates a mask of d number of "on" bits, or bits with the value of 1. As such, when the value of h is bitwise ANDed to the bit mask created by the term ((1<<d)-1), i.e., by the term (h & ((1<<d)-1)), the result is only those bits from h that were lost when the value of h was shifted to the right by d bits, i.e., by the term (h>>d), in calculating p.

If the value of these "lost" bits that were lost in the calculation of p represent a large value, then there is a relatively good chance that the value returned by randomBits(d) will be smaller than the value of these "lost" bits, which gives a good probability that the aggregate approximate counter value resulting from summing the approximate counters will be the larger possible value, i.e., p+1. Conversely, if the value of these "lost" bits is small, then there is a relatively small chance that the value returned by randomBits(d) will be smaller than the value of these "lost" bits, which gives a small probability that the aggregate approximate counter value resulting from summing the approximate counters will be p+1. Thus, the choice between p and p+1 is made such that the final statistical expected value of the aggregated approximate counter is equal to the sum of the expected values of the approximate counters to be added together.

If the term randomBits(d)<(h & ((1<<d)−1)) is true, then the expected value of the variable topicCounts[w, y] regarded as an approximate counter will be (($2^s$+(p+1) & ($2^s$−1))<<((p+1)>>s))−$2^s$. Otherwise sampling service 124A assigns the value p to the variable topicCounts[w, y], and its expected value regarded as an approximate counter will be (($2^s$+p & ($2^s$−1))<<(p>>s))−$2^s$. Multiplying these two expected values by their respective probabilities of occurring and then adding the results, the overall expected value for the variable topicCounts[w, y] is exactly the sum of the two original expected values.

In another embodiment, the "for all" loop starting at Pseudocode V, line 6 executes its iterations sequentially, and lines 39-42 of Pseudocode V that increment the counter documentCounts[m][j] is replaced with the following code:

```
1:  begin
2:      let n ← documentCounts[m][j] >> s
3:      let C ← collection of n uniformly pseudorandomly chosen bits
4:      if every bit in C is zero then
5:          documentCounts[m][j] ← n+1
6:      end if
7:  end
```

Results of Running the Sampler

Again returning to flowchart 200 of FIG. 2, at step 212, one or more sets of correlated words are determined from the sampler result data. For example, sampling service 124A continues to run the Gibbs sampler—represented in one of the versions of the Pseudocode (III, IV, or V) described above—as part of a distributed system and over the data in document set 142 until a satisfactory level of convergence is detected. A satisfactory level of convergence may be detected based on one or more of: a number of iterations of the Gibbs sampler, the likelihood of the parameters does not increase significantly anymore, the perplexity of the parameters does not decrease anymore, etc.

Once convergence is reached, distributed system 120 has, through the Gibbs sampler, assigned each word of the plurality of words in each document of document set 142 to a particular topic. According to an embodiment, the plurality of words is less than all of the words in the documents of document set 142. According to an embodiment, the plurality of words is all of the words in the documents of document set 142. According to embodiments, distributed system 120 causes the return, to sampling client 112, of information for K number of lists of correlated words identified from document set 142.

According to an embodiment, the sets of correlated words are not automatically associated with topic names, or interpretations of the identified correlations, etc. Specifically, the word groupings are based on correlations that were automatically detected in the given set of documents via the Gibbs sampler. For example, the distributed system comprising sampling service 124A identifies a correlation between two words based on the inclusion of the two words together in a single document of document set 142. In a similar vein, the distributed system comprising sampling service 124A identifies a strong correlation between the two words based on the inclusion of the two words together in each of multiple documents. As a further example, the distributed system comprising sampling service 124A identifies a strong correlation between the two words based on the inclusion of two words together in the same sentence in one or more of the documents.

Additional Remarks

Upon initial inspection, it is far from obvious that using approximate counters rather than conventional counters allows the LDA Gibbs algorithm to function effectively. For example, approximate counters introduce statistical variation to a system, and it is not obvious that this introduced statistical variation would not overwhelm the statistical properties of an LDA Gibbs sampler.

However, experimentation and careful measurements show that the introduction of approximate counters into a distributed LDA Gibbs sampler algorithm in fact does allow the algorithm to function effectively. Moreover, the use of approximate counters in a distributed LDA Gibbs algorithm in some cases allows the algorithm to execute more quickly (up to 25% faster) than a similar algorithm using conventional counters, despite the fact that the incrementation, addition, and access procedures for approximate counters are more complicated than for conventional counters.

It appears that the speed increase results in part from the fact that there is less memory traffic since actual changes to the values stored at the approximate counters (especially changes accomplished through a compareAndSwap operation) are performed conditionally and, in practice, relatively rarely. Further speed increase from implementing approximate counters in a distributed LDA Gibbs algorithm result from the fact that the representation size of approximate counters is much smaller than the representation size of conventional counters (for example, 8 or fewer bits rather than 32 bits), and so correspondingly less network traffic and bandwidth is required as the nodes send information to each other (and receive data from each other).

The distributed LDA Gibbs algorithm implemented on a multi-node cluster (e.g., with four nodes, each having one CPU and two GPUs) with binary Morris, general Morris, and Csűrös approximate counters each converge with good speed. The binary Morris counters are rather coarse-grained; the effect of this is to waste some bits. The wasted bits affect the performance of the LDA Gibbs sampler, since the Gibbs sampler that uses binary Morris counters converges to a somewhat lower log-likelihood figure-of-merit than LDA Gibbs samplers using other types of counters. General Morris approximate counters with q=1.1 and Csűrös approximate counters perform about the same, and cause the LDA Gibbs sampler to converge to roughly the same log-likelihood figure-of-merit achieved using conventional counters.

Just as one can use counters of different sizes in the original LDA Gibbs algorithm (for example, using 16-bit counters in the documentCounts array if it is known that no document contains more than 65,535 words), so one can use approximate counters of various sizes as well. Embodiments are described herein that use 8 bits for each approximate counter, but embodiments comprise approximate counters represented using less than 8 bits—or more than 8 bits.

For example, in alternate embodiments, the approximate counters are each represented using 4, 5, 6, 7, 10, or 12 bits. Moreover, when using general Morris counters, the parameter q may be chosen to be a value other than 1.1, and when using Csűrös counters, the parameter s may be chosen to be an integer other than 4 or 5.

Furthermore, according to embodiments, counter sizes and/or parameter values used in the three arrays need not all be the same. For example, one might use 4-bit or 5-bit approximate counters in the documentCounts array while using 8-bit counters in the topicCounts and topicAssignments arrays.

Also, embodiments implement a mixture of two or more of: conventional counters, binary Morris approximate counters, general Morris approximate counters, Csűrös approximate counters, etc. For example, the nodes of distributed system 120 represent the counters in topicCounts using binary Morris approximate counters, the counters in documentCounts using Csűrös approximate counters, and uses ordinary 32-bit integer counters in the topicAssignments array. Any two or more types of counters may be used in the distributed LDA Gibbs sampler, as long as all of the counters for a particular array/matrix are represented with the same kind of counter (e.g., all counters in topicCounts arrays throughout distributed system are represented using a particular type of counter).

Finally, there are other representations and algorithms for approximate counters, such as the two presented by Dice, Lev, and Moir (one in which the representation is similar to that of Csűrös, and one in which the representation in the counter is the probability that the counter value should change on an incrementation operation). According to an embodiment, the Dice, Lev, and Moir approximate counter is a type of counter that is used for the distributed LDA Gibbs algorithm. For more information on Dice, Lev, and Moir approximate counters, see the following document, the contents of which are incorporated herein by reference: Dave Dice, Yossi Lev, and Mark Moir. Scalable statistics counters. In *Proceedings of the 18th ACM SIGPLAN Symposium on Principles and Practice of Parallel Programming*, PPoPP '13, pages 307-308, New York, N.Y., USA, 2013. ACM.

In an embodiment, incrementation of at least one kind of approximate counter is configured to "saturate," that is, to allow the counter to remain at the highest representable value when its value is incremented rather than "wrap around" to zero or to the most negative integer (depending on whether the approximate counter is implemented using unsigned or signed integers). For example, in one embodiment, 8-bit unsigned integers are used as binary Morris approximate counters, and the code for incrementing documentCounts[m][j] is as follows:

```
1:  repeat
2:      let n ← documentCounts[m][j]
3:      let C ← collection of n uniformly pseudorandomly chosen bits
4:  until (some bit in C is nonzero or else
            n = 2^8 − 1 or else
            compareAndSwap(documentCounts[m][j], n, n + 1)
            succeeds)
```

In an embodiment, addition of at least one kind of approximate counter is configured to "saturate", that is, to allow the counter to remain at the highest representable value rather than "wrap around" to zero or to the most negative integer (depending on whether one the approximate counters are implemented using unsigned or signed integers). For example, in one embodiment, 8-bit unsigned integers are used as binary Morris approximate counters, and the pseudocode describing adding documentCountsRemote[m][j] into documentCounts[m][y] is as follows:

```
1:  let p ← max(documentCounts[m, y], documentCountsRemote[m, j])
2:  let q ← min(documentCounts[m, y], documentCountsRemote[m, j])
3:  if allZeroRandomBits(p − q) and also ¬ allZeroRandomBits(q) and
       also p < 2^8 − 1 then
4:      documentCounts[m, y] ← p + 1
5:  else
6:      documentCounts[m, y] ← p
7:  end if
```

As another example according to an embodiment, 8-bit unsigned integers are used as general Morris approximate counters with q=1.1, and the pseudocode describing adding documentCountsRemote[m][j] into documentCounts[m][y] is as follows:

```
1:   let a ← documentCounts[m, y]
2:   let b ← documentCountsRemote[m, j]
3:   let r ← q^a + q^b
```

$$\text{4:} \quad \text{let } s \leftarrow \frac{r-2}{q-1}$$

```
5:   let p ← ⌊log_q (r − 1)⌋
```

$$\text{6:} \quad \text{let } v \leftarrow \frac{q^p - 1}{q - 1}$$

```
7:   if p ≥ 2^8 − 1 then
8:       documentCounts[m, y] ← 2^8 − 1
9:   else if random( ) < q^{-p}(s − v) then
10:      documentCounts[m, y] ← p + 1
11:  else
12:      documentCounts[m, y] ← p
13:  end if
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
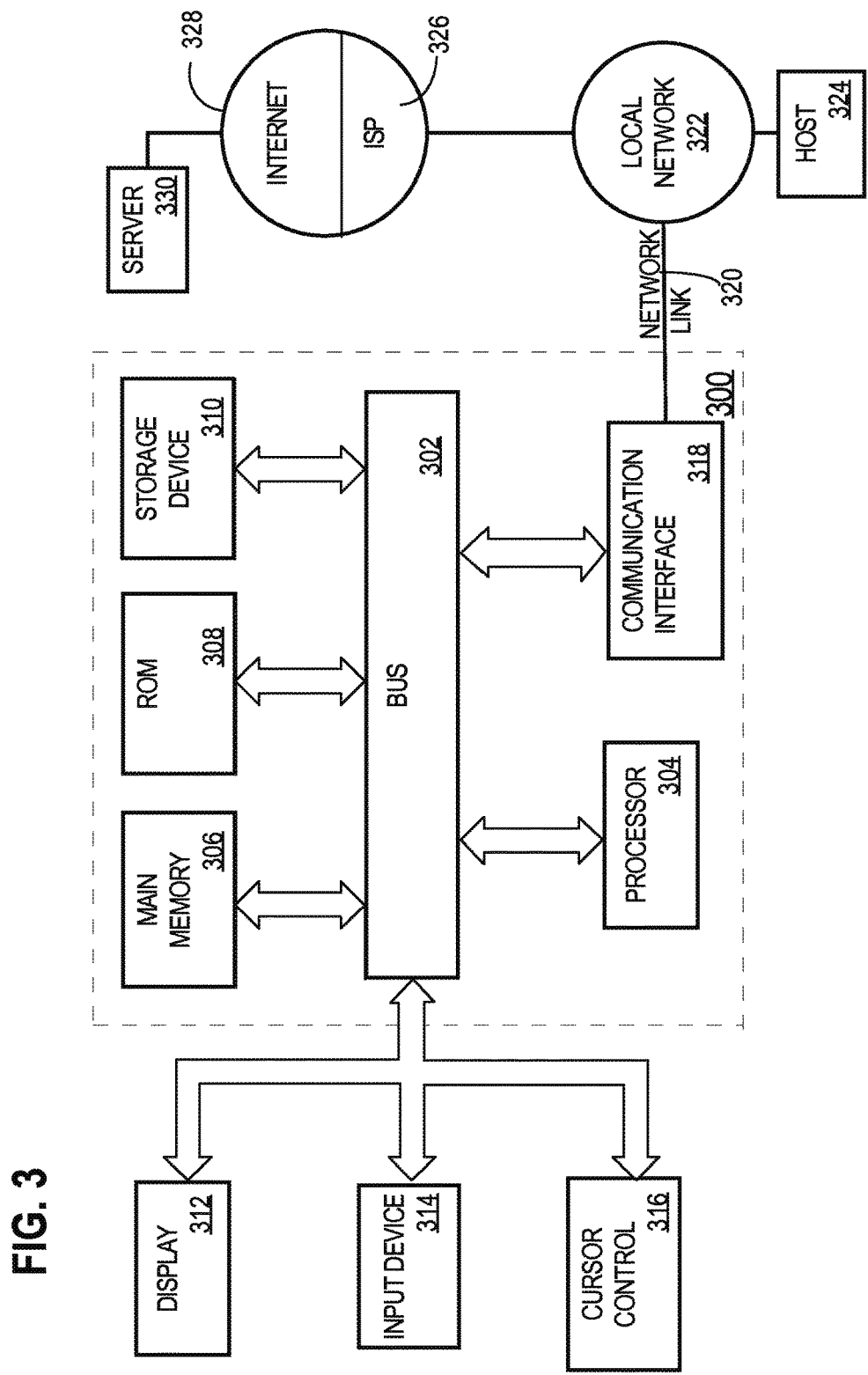
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for a distributed system, including a first computing device and a second computing device communicatively connected via a network, running a distributed uncollapsed Gibbs sampler comprising:
   the first computing device running the uncollapsed Gibbs sampler over a Dirichlet distribution of a plurality of words in a set of documents to produce sampler result data, further comprising:
      receiving, from the second computing device, a first approximate counter value that corresponds to a particular counter of the distributed uncollapsed Gibbs sampler,
      using one or more probabilistic techniques to increment a second approximate counter value that also corresponds to the particular counter;
      adding the first approximate counter value to the second approximate counter value to produce an aggregate approximate counter value, and
      converting the aggregate approximate counter value to an expected value represented by the aggregate approximate counter value; and
      using the expected value generated from the aggregate approximate counter value as the value of the particular counter; and
   determining, from the sampler result data, one or more sets of correlated words.

2. The method of claim 1, wherein:
   the first and second approximate counter values are binary Morris approximate counter values; and
   adding the first approximate counter value to the second approximate counter value comprises:
      identifying which of the first and second approximate counter values is the largest, among the first and second approximate counter values, and which of the first and second approximate counter values is the smallest, among the first and second approximate counter values,
      determining a difference value that represents a difference between the largest of the first and second approximate counter values and the smallest of the first and second approximate counter values,
      generating a first set of uniform random bits, wherein the number of bits, in the first set of uniform random bits, is the difference value,
      generating a second set of uniform random bits, wherein the number of bits, in the second set of uniform random bits, is the smallest of the values,
      responsive to determining that both of (a) all of the first set of uniform random bits have zero values, and (b) at least one of the bits in the second set of uniform random bits has a value of one: setting the aggregate approximate counter value to be one more than the largest of the values, and
      responsive to determining that either (a) at least one of the bits of the first set of uniform random bits has a value of one, or (b) all of the second set of uniform random bits have zero values: setting the aggregate approximate counter value to be the largest of the values.

3. The method of claim 1, wherein:
   the first and second approximate counter values are general Morris approximate counter values; and
   adding the first approximate counter value to the second approximate counter value comprises:
      calculating a sum value that represents a sum of expected values of the first and second approximate counter values,
      identifying a particular general Morris approximate counter value, wherein:
         an expected value of the particular general Morris approximate counter value is not above the sum value, and
         an expected value of one more than the particular general Morris approximate counter value is above the sum value;
      generating a random real value chosen uniformly pseudorandomly;
      determining whether the random real value is less than a difference value that is based, at least in part, on a difference between the sum value and the expected value of the particular general Morris approximate counter value;
      responsive to determining that the random real value is less than the difference value: setting the aggregate approximate counter value to be one more than the particular general Morris approximate counter value, and
      responsive to determining that the random real value is not less than the difference value: setting the aggregate approximate counter value to be the particular general Morris approximate counter value.

4. The method of claim 1, wherein:
   the first and second approximate counter values are Csűrös approximate counter values; and
   adding the first approximate counter value to the second approximate counter value comprises:
      calculating a sum value that represents a sum of expected values of the first and second approximate counter values,
      identifying a particular Csűrös approximate counter value based, at least in part, on a first subset of bits representing the sum value, wherein:
         an expected value of the particular Csűrös approximate counter value is not above the sum value, and
         an expected value of one more than the particular Csűrös approximate counter value is above the sum value;
      generating a random integer value chosen uniformly pseudorandomly;
      determining whether the random integer value is less than a value represented by a second subset of the bits representing the sum value;
      wherein the bits in the first subset are located at distinct positions, within the representation of the sum value, from positions, within the representation of the sum value, of the bits in the second subset;
      responsive to determining that the random integer value is less than the value represented by the second subset of the bits representing the sum value: setting the aggregate approximate counter value to be one more than the particular Csűrös approximate counter value, and responsive to determining that the random integer value is not less than the value represented by the second subset of the bits representing the sum value: setting the aggregate approximate counter value to be the particular Csűrös approximate counter value.

5. The method of claim 1, wherein the first approximate counter value is represented by at most 8 bits.

6. The method of claim 1, further comprising, previous to adding the first approximate counter value to the second approximate counter value, the first computing device producing the second approximate counter value based on running the uncollapsed Gibbs sampler.

7. The method of claim 1, wherein the uncollapsed Gibbs sampler is a Greedy Gibbs sampler.

8. The method of claim 1, wherein the first computing device running the uncollapsed Gibbs sampler comprises performing one or more computations on a Graphics Processing Unit (GPU).

9. The method of claim 1, further comprising:
receiving, from the second computing device, a third counter value;
adding the third counter value to a fourth counter value to produce a second aggregate counter value; and
wherein the first and second approximate counter values are of a first type of approximate counter, and the third and fourth counter values are of a second type of approximate counter;
wherein the first and second types of approximate counters are distinct types of approximate counters;
wherein the first type of approximate counter is one of: binary Morris approximate counters, general Morris approximate counters, or Csűrös approximate counters; and
wherein the second type of approximate counter is one of: binary Morris approximate counters, general Morris approximate counters, Csűrös approximate counters, or conventional counters.

10. One or more non-transitory computer-readable media storing one or more sequences of instructions which, when executed by one or more processors, cause performance of a distributed system, including a first computing device and a second computing device communicatively connected via a network, running a distributed uncollapsed Gibbs sampler comprising:
the first computing device running the uncollapsed Gibbs sampler over a Dirichlet distribution of a plurality of words in a set of documents to produce sampler result data, further comprising:
receiving, from the second computing device, a first approximate counter value that corresponds to a particular counter of the distributed uncollapsed Gibbs sampler,
using one or more probabilistic techniques to increment a second approximate counter value that also corresponds to the particular counter;
adding the first approximate counter value to the second approximate counter value to produce an aggregate approximate counter value, and
converting the aggregate approximate counter value to an expected value represented by the aggregate approximate counter value; and
using the expected value generated from the aggregate approximate counter value as the value of the particular counter; and
determining, from the sampler result data, one or more sets of correlated words.

11. The one or more non-transitory computer-readable media of claim 10, wherein:
the first and second approximate counter values are binary Morris approximate counter values; and
adding the first approximate counter value to the second approximate counter value comprises:
identifying which of the first and second approximate counter values is the largest, among the first and second approximate counter values, and which of the first and second approximate counter values is the smallest, among the first and second approximate counter values,
determining a difference value that represents a difference between the largest of the first and second approximate counter values and the smallest of the first and second approximate counter values,
generating a first set of uniform random bits, wherein the number of bits, in the first set of uniform random bits, is the difference value,
generating a second set of uniform random bits, wherein the number of bits, in the second set of uniform random bits, is the smallest of the values,
responsive to determining that both of (a) all of the first set of uniform random bits have zero values, and (b) at least one of the bits in the second set of uniform random bits has a value of one: setting the aggregate approximate counter value to be one more than the largest of the values, and
responsive to determining that either (a) at least one of the bits of the first set of uniform random bits has a value of one, or (b) all of the second set of uniform random bits have zero values: setting the aggregate approximate counter value to be the largest of the values.

12. The one or more non-transitory computer-readable media of claim 10, wherein:
the first and second approximate counter values are general Morris approximate counter values; and
adding the first approximate counter value to the second approximate counter value comprises:
calculating a sum value that represents a sum of expected values of the first and second approximate counter values,
identifying a particular general Morris approximate counter value, wherein:
an expected value of the particular general Morris approximate counter value is not above the sum value, and
an expected value of one more than the particular general Morris approximate counter value is above the sum value;
generating a random real value chosen uniformly pseudorandomly;
determining whether the random real value is less than a difference value that is based, at least in part, on a difference between the sum value and the expected value of the particular general Morris approximate counter value;
responsive to determining that the random real value is less than the difference value: setting the aggregate approximate counter value to be one more than the particular general Morris approximate counter value, and
responsive to determining that the random real value is not less than the difference value: setting the aggregate approximate counter value to be the particular general Morris approximate counter value.

13. The one or more non-transitory computer-readable media of claim 10, wherein:
   the first and second approximate counter values are Csűrös approximate counter values; and
   adding the first approximate counter value to the second approximate counter value comprises:
      calculating a sum value that represents a sum of expected values of the first and second approximate counter values,
      identifying a particular Csűrös approximate counter value based, at least in part, on a first subset of bits representing the sum value, wherein:
         an expected value of the particular Csűrös approximate counter value is not above the sum value, and
         an expected value of one more than the particular Csűrös approximate counter value is above the sum value;
      generating a random integer value chosen uniformly pseudorandomly;
      determining whether the random integer value is less than a value represented by a second subset of the bits representing the sum value;
      wherein the bits in the first subset are located at distinct positions, within the representation of the sum value, from positions, within the representation of the sum value, of the bits in the second subset;
      responsive to determining that the random integer value is less than the value represented by the second subset of the bits representing the sum value: setting the aggregate approximate counter value to be one more than the particular Csűrös approximate counter value, and
      responsive to determining that the random integer value is not less than the value represented by the second subset of the bits representing the sum value: setting the aggregate approximate counter value to be the particular Csűrös approximate counter value.

14. The one or more non-transitory computer-readable media of claim 10, wherein the first approximate counter value is represented by at most 8 bits.

15. The one or more non-transitory computer-readable media of claim 10, wherein the one or more sequences of instructions further comprise instructions which, when executed by one or more processors, cause, previous to adding the first approximate counter value to the second approximate counter value, the first computing device producing the second approximate counter value based on running the uncollapsed Gibbs sampler.

16. The one or more non-transitory computer-readable media of claim 10, wherein the uncollapsed Gibbs sampler is a Greedy Gibbs sampler.

17. The one or more non-transitory computer-readable media of claim 10, wherein the first computing device running the uncollapsed Gibbs sampler comprises performing one or more computations on a Graphics Processing Unit (GPU).

18. The one or more non-transitory computer-readable media of claim 10, wherein the one or more sequences of instructions further comprise instructions which, when executed by one or more processors, cause:
   receiving, from the second computing device, a third counter value;
   adding the third counter value to a fourth counter value to produce a second aggregate counter value; and
   wherein the first and second approximate counter values are of a first type of approximate counter, and the third and fourth counter values are of a second type of approximate counter;
   wherein the first and second types of approximate counters are distinct types of approximate counters;
   wherein the first type of approximate counter is one of: binary Morris approximate counters, general Morris approximate counters, or Csűrös approximate counters; and
   wherein the second type of approximate counter is one of: binary Morris approximate counters, general Morris approximate counters, Csűrös approximate counters, or conventional counters.

19. A method for adding approximate counter values comprising:
   using one or more probabilistic techniques to increment each of a first and a second approximate counter value, respectively;
   wherein each of the first and second approximate counter values are respectively represented by at most sixteen bits;
   wherein each of the first and second approximate counter values represents a corresponding expected value;
   adding the first approximate counter value to the second approximate counter value to produce an aggregate approximate counter value;
   wherein the aggregate approximate counter value represents a sum of the expected values of the first and second approximate counter values;
   wherein the aggregate approximate counter value is represented by at most sixteen bits; and
   wherein the method is performed by one or more computing devices.

20. The method of claim 19, wherein:
   the first and second approximate counter values are binary Morris approximate counter values; and
   adding the first approximate counter value to the second approximate counter value is performed by:
      identifying which of the first and second approximate counter values is the largest, among the first and second approximate counter values, and which of the first and second approximate counter values is the smallest, among the first and second approximate counter values,
      determining a difference value that represents a difference between the largest of the first and second approximate counter values and the smallest of the first and second approximate counter values,
      generating a first set of uniform random bits, wherein the number of bits, in the first set of uniform random bits, is the difference value,
      generating a second set of uniform random bits, wherein the number of bits, in the second set of uniform random bits, is the smallest of the values,
      responsive to determining that both of (a) all of the first set of uniform random bits have zero values, and (b) at least one of the bits in the second set of uniform random bits has a value of one: setting the aggregate approximate counter value to be one more than the largest of the values, and
      responsive to determining that either (a) at least one of the bits of the first set of uniform random bits has a value of one, or (b) all of the second set of uniform random bits have zero values: setting the aggregate approximate counter value to be the largest of the values.

21. The method of claim 19, wherein:
the first and second approximate counter values are general Morris approximate counter values; and
adding the first approximate counter value to the second approximate counter value is performed by:
  calculating a sum value that represents a sum of expected values of the first and second approximate counter values,
  identifying a particular general Morris approximate counter value, wherein:
    an expected value of the particular general Morris approximate counter value is not above the sum value, and
    an expected value of one more than the particular general Morris approximate counter value is above the sum value;
  generating a random real value chosen uniformly pseudorandomly;
  determining whether the random real value is less than a difference value that is based, at least in part, on a difference between the sum value and the expected value of the particular general Morris approximate counter value;
  responsive to determining that the random real value is less than the difference value: setting the aggregate approximate counter value to be one more than the particular general Morris approximate counter value, and
  responsive to determining that the random real value is not less than the difference value: setting the aggregate approximate counter value to be the particular general Morris approximate counter value.

22. The method of claim 19, wherein:
the first and second approximate counter values are Csűrös approximate counter values; and
adding the first approximate counter value to the second approximate counter value is performed by:
  calculating a sum value that represents a sum of expected values of the first and second approximate counter values,
  identifying a particular Csűrös approximate counter value based, at least in part, on a first subset of bits representing the sum value, wherein:
    an expected value of the particular Csűrös approximate counter value is not above the sum value, and
    an expected value of one more than the particular Csűrös approximate counter value is above the sum value;
  generating a random integer value chosen uniformly pseudorandomly;
  determining whether the random integer value is less than a value represented by a second subset of the bits representing the sum value;
  wherein the bits in the first subset are located at distinct positions, within the representation of the sum value, from positions, within the representation of the sum value, of the bits in the second subset;
  responsive to determining that the random integer value is less than the value represented by the second subset of the bits representing the sum value: setting the aggregate approximate counter value to be one more than the particular Csűrös approximate counter value, and
  responsive to determining that the random integer value is not less than the value represented by the second subset of the bits representing the sum value: setting the aggregate approximate counter value to be the particular Csűrös approximate counter value.

23. The method of claim 19, wherein:
using one or more probabilistic techniques to increment the first approximate counter value is performed by a first computing device;
using one or more probabilistic techniques to increment the second approximate counter value is performed by a second computing device;
the method further comprises, prior to adding the first approximate counter value to the second approximate counter value, the first computing device receiving the second approximate counter value from the second computing device; and
adding the first approximate counter value to the second approximate counter value is performed by the first computing device.

24. One or more non-transitory computer-readable media storing one or more sequences of instructions which, when executed by one or more processors, cause:
  using one or more probabilistic techniques to increment each of a first and a second approximate counter value, respectively;
  wherein each of the first and second approximate counter values are respectively represented by at most sixteen bits;
  wherein each of the first and second approximate counter values represents a corresponding expected value;
  adding the first approximate counter value to the second approximate counter value to produce an aggregate approximate counter value;
  wherein the aggregate approximate counter value represents a sum of the expected values of the first and second approximate counter values;
  wherein the aggregate approximate counter value is represented by at most sixteen bits.

25. The one or more non-transitory computer-readable media of claim 24, wherein:
using one or more probabilistic techniques to increment the first approximate counter value is performed by a first computing device;
using one or more probabilistic techniques to increment the second approximate counter value is performed by a second computing device;
the one or more sequences of instructions further comprise instructions which, when executed by one or more processors, cause, prior to adding the first approximate counter value to the second approximate counter value, the first computing device receiving the second approximate counter value from the second computing device; and
adding the first approximate counter value to the second approximate counter value is performed by the first computing device.

26. The one or more non-transitory computer-readable media of claim 24, wherein:
the first and second approximate counter values are binary Morris approximate counter values; and
adding the first approximate counter value to the second approximate counter value is performed by:
  identifying which of the first and second approximate counter values is the largest, among the first and second approximate counter values, and which of the first and second approximate counter values is the smallest, among the first and second approximate counter values, determining a difference value that represents a difference between the largest of the first and second approximate counter values and the smallest of the first and second approximate counter values, generating a first set of uniform random bits, wherein the number of bits, in the first set of uniform random bits, is the difference value, generating a second set of uniform random bits, wherein the number of bits, in the second set of uniform random bits, is the smallest of the values, responsive to determining that both of (a) all of the first set of uniform random bits have zero values, and (b) at least one of the bits in the second set of uniform random bits has a value of one: setting the aggregate approximate counter value to be one more than the largest of the values, and responsive to determining that either (a) at least one of the bits of the first set of uniform random bits has a value of one, or (b) all of the second set of uniform random bits have zero values: setting the aggregate approximate counter value to be the largest of the values.

27. The one or more non-transitory computer-readable media of claim 24, wherein:

the first and second approximate counter values are general Morris approximate counter values; and adding the first approximate counter value to the second approximate counter value is performed by:

calculating a sum value that represents a sum of expected values of the first and second approximate counter values, identifying a particular general Morris approximate counter value, wherein:

an expected value of the particular general Morris approximate counter value is not above the sum value, and an expected value of one more than the particular general Morris approximate counter value is above the sum value;

generating a random real value chosen uniformly pseudorandomly;

determining whether the random real value is less than a difference value that is based, at least in part, on a difference between the sum value and the expected value of the particular general Morris approximate counter value;

responsive to determining that the random real value is less than the difference value: setting the aggregate approximate counter value to be one more than the particular general Morris approximate counter value, and responsive to determining that the random real value is not less than the difference value: setting the aggregate approximate counter value to be the particular general Morris approximate counter value.

28. The one or more non-transitory computer-readable media of claim 24, wherein:

the first and second approximate counter values are Csűrös approximate counter values; and adding the first approximate counter value to the second approximate counter value is performed by:

calculating a sum value that represents a sum of expected values of the first and second approximate counter values, identifying a particular Csűrös approximate counter value based, at least in part, on a first subset of bits representing the sum value, wherein:

an expected value of the particular Csűrös approximate counter value is not above the sum value, and an expected value of one more than the particular Csűrös approximate counter value is above the sum value;

generating a random integer value chosen uniformly pseudorandomly;

determining whether the random integer value is less than a value represented by a second subset of the bits representing the sum value;

wherein the bits in the first subset are located at distinct positions, within the representation of the sum value, from positions, within the representation of the sum value, of the bits in the second subset;

responsive to determining that the random integer value is less than the value represented by the second subset of the bits representing the sum value: setting the aggregate approximate counter value to be one more than the particular Csűrös approximate counter value, and responsive to determining that the random integer value is not less than the value represented by the second subset of the bits representing the sum value: setting the aggregate approximate counter value to be the particular Csűrös approximate counter value.

* * * * *